(12) United States Patent
Schubert et al.

(10) Patent No.: US 8,993,706 B2
(45) Date of Patent: *Mar. 31, 2015

(54) CURABLE MATERIAL COMPRISING SILYLATED POLYMERS CONTAINING URETHANE GROUPS, AND USE THEREOF IN SEALANTS, ADHESIVES, BINDERS AND/OR SURFACE MODIFIERS

(75) Inventors: Frank Schubert, Neukirchen-Vluyn (DE); Wilfried Knott, Essen (DE); Michael Ferenz, Essen (DE); Stefan Silber, Krefeld (DE)

(73) Assignee: Evonik Degussa GmbH, Essen (DE)

( * ) Notice: Subject to any disclaimer, the term of this patent is extended or adjusted under 35 U.S.C. 154(b) by 521 days.

This patent is subject to a terminal disclaimer.

(21) Appl. No.: 12/859,435

(22) Filed: Aug. 19, 2010

(65) Prior Publication Data

US 2011/0042004 A1    Feb. 24, 2011

(30) Foreign Application Priority Data

Aug. 19, 2009 (DE) .......................... 10 2009 028 640

(51) Int. Cl.
*C08G 77/04* (2006.01)
*C09J 7/02* (2006.01)
(Continued)

(52) U.S. Cl.
CPC ........ *C08G 18/5096* (2013.01); *C08G 18/0866* (2013.01); *C08G 18/10* (2013.01); *C08G 18/2825* (2013.01); *C08G 18/289* (2013.01); *C08G 18/718* (2013.01); *C08G 18/755* (2013.01); *C08G 18/792* (2013.01); *C08G 65/22* (2013.01); *C08G 65/33348* (2013.01); *C08G 65/336* (2013.01); *C09D 175/08* (2013.01)

USPC ............ 528/28; 156/329; 521/154; 524/588; 524/869; 525/523

(58) Field of Classification Search
CPC ............... C08G 18/42; C08G 18/4205; C08G 18/4244; C08G 18/4263; C08G 18/4692; C08G 18/4607; C08G 64/00; C08G 65/2618; C08G 65/26; C08G 18/281; C08G 18/28; C09D 175/08; C09J 175/08
USPC ....................................... 525/523
See application file for complete search history.

(56) References Cited

U.S. PATENT DOCUMENTS 3,502,704 A * 3/1970 McKellar ...................... 556/414
5,401,871 A    3/1995 Feldmann-Krane et al.
(Continued)

FOREIGN PATENT DOCUMENTS

GB    1 113 228 A    5/1968
JP    05-125176    5/1993
(Continued)

OTHER PUBLICATIONS

Hosono et al., JP 2007-031530 A machine-generated English translation, Feb. 8, 2007.*

(Continued)

*Primary Examiner* — Peter F Godenschwager
*Assistant Examiner* — David Karst
(74) *Attorney, Agent, or Firm* — Frommer Lawrence & Haug LLP

(57) ABSTRACT

Curable material comprising silylated polymers containing urethane groups, and use thereof in sealants, adhesives, binders and/or surface modifiers.

17 Claims, 1 Drawing Sheet

Silyl polyethers 1 of the formula (2)

(51) Int. Cl.

| | | |
|---|---|---|
| *C08G 77/00* | (2006.01) | |
| *C08L 83/00* | (2006.01) | |
| *C07F 7/08* | (2006.01) | |
| *C08L 63/00* | (2006.01) | |
| *C08G 18/50* | (2006.01) | |
| *C08G 18/08* | (2006.01) | |
| *C08G 18/10* | (2006.01) | |
| *C08G 18/28* | (2006.01) | |
| *C08G 18/71* | (2006.01) | |
| *C08G 18/75* | (2006.01) | |
| *C08G 18/79* | (2006.01) | |
| *C08G 65/22* | (2006.01) | |
| *C08G 65/333* | (2006.01) | |
| *C08G 65/336* | (2006.01) | |
| *C09D 175/08* | (2006.01) | |

(56) References Cited

U.S. PATENT DOCUMENTS

| | | | |
|---|---|---|---|
| 5,475,127 A | 12/1995 | Klein et al. | |
| 5,804,099 A | 9/1998 | Heilen et al. | |
| 6,054,534 A | 4/2000 | Josten et al. | |
| 6,235,813 B1 | 5/2001 | Brandt et al. | |
| 6,291,622 B1 | 9/2001 | Droese et al. | |
| 6,307,082 B1 | 10/2001 | Klein et al. | |
| 6,552,091 B1 | 4/2003 | Boinowitz et al. | |
| 6,835,420 B1 | 12/2004 | Rockrath et al. | |
| 6,844,376 B1 | 1/2005 | Jacobine et al. | |
| 6,858,663 B2 | 2/2005 | Knott et al. | |
| 7,125,585 B2 | 10/2006 | Dudzik et al. | |
| 7,196,153 B2 | 3/2007 | Burkhart et al. | |
| 7,557,173 B2 * | 7/2009 | Bachon et al. | 528/35 |
| 7,598,334 B2 | 10/2009 | Ferenz et al. | |
| 7,612,158 B2 | 11/2009 | Burkhart et al. | |
| 7,612,159 B2 | 11/2009 | Burkhart et al. | |
| 7,619,035 B2 | 11/2009 | Henning et al. | |
| 7,635,581 B2 | 12/2009 | Ferenz et al. | |
| 7,645,848 B2 | 1/2010 | Knott et al. | |
| 7,727,599 B2 | 6/2010 | Dohler et al. | |
| 2007/0128143 A1 | 6/2007 | Gruning et al. | |
| 2008/0027202 A1 | 1/2008 | Ferenz et al. | |
| 2008/0034794 A1 | 2/2008 | Ebbrecht et al. | |
| 2008/0076842 A1 | 3/2008 | Ferenz et al. | |
| 2008/0153934 A1 | 6/2008 | Neumann et al. | |
| 2008/0153992 A1 | 6/2008 | Knott et al. | |
| 2008/0153995 A1 | 6/2008 | Knott et al. | |
| 2008/0305065 A1 | 12/2008 | Ferenz et al. | |
| 2009/0018302 A1 | 1/2009 | Laas et al. | |
| 2009/0018480 A1 * | 1/2009 | Mager et al. | 602/46 |
| 2009/0030097 A1 | 1/2009 | Knott et al. | |
| 2009/0062459 A1 | 3/2009 | Thum et al. | |
| 2009/0137751 A1 | 5/2009 | Knott et al. | |
| 2009/0137752 A1 | 5/2009 | Knott et al. | |
| 2010/0022435 A1 | 1/2010 | Henning et al. | |
| 2010/0041910 A1 | 2/2010 | Schubert et al. | |
| 2010/0055760 A1 | 3/2010 | Thum et al. | |
| 2010/0056649 A1 | 3/2010 | Henning et al. | |
| 2010/0056818 A1 | 3/2010 | Ferenz et al. | |
| 2010/0071849 A1 | 3/2010 | Knott et al. | |
| 2010/0081781 A1 | 4/2010 | Schubert et al. | |
| 2010/0105843 A1 | 4/2010 | Knott et al. | |
| 2010/0113633 A1 | 5/2010 | Henning et al. | |

FOREIGN PATENT DOCUMENTS

| | | |
|---|---|---|
| JP | 06-158024 | 6/1994 |
| JP | H11-511748 | 10/1999 |
| JP | 2001049169 | 2/2001 |
| JP | 2002080584 | 3/2002 |
| JP | 2002256047 | 9/2002 |
| JP | 2006225309 | 8/2006 |
| JP | 2007-031530 | 2/2007 |
| JP | 2008056758 | 3/2008 |
| JP | 2009-030050 | 2/2009 |
| WO | WO 96/38453 | 12/1996 |
| WO | WO 01/21718 A1 | 3/2001 |
| WO | WO 2005/042608 A1 | 5/2005 |
| WO | WO 2005/078036 | 8/2005 |
| WO | WO 2005/078036 A1 | 8/2005 |
| WO | WO 2005/105939 | 11/2005 |
| WO | WO 2009/065641 | 5/2009 |
| WO | WO 2009/065644 | 5/2009 |

OTHER PUBLICATIONS

Silane Coupling Agent KH-570 product information; Chemical Industry Press w/ English Translation.

English Translation of JP Office Action mailed Nov. 21, 2013 in JP2010-182005.

* cited by examiner

Silyl polyethers 1 of the formula (2)
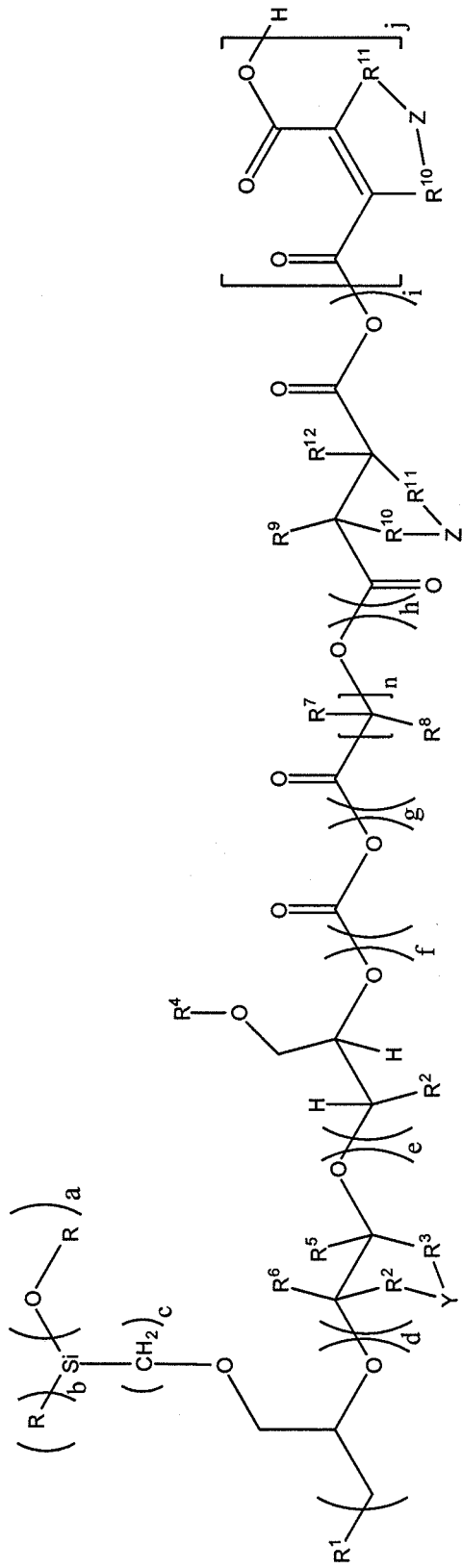

CURABLE MATERIAL COMPRISING SILYLATED POLYMERS CONTAINING URETHANE GROUPS, AND USE THEREOF IN SEALANTS, ADHESIVES, BINDERS AND/OR SURFACE MODIFIERS

This application claims benefit under 35 U.S.C. 119(a) of German patent application DE 10 2009 028640.3, filed on Aug. 19, 2009.

Any foregoing applications including German patent application DE 10 2009 028640.3, and all documents cited therein or during their prosecution ("application cited documents") and all documents cited or referenced in the application cited documents, and all documents cited or referenced herein ("herein cited documents"), and all documents cited or referenced in herein cited documents, together with any manufacturer's instructions, descriptions, product specifications, and product sheets for any products mentioned herein or in any document incorporated by reference herein, are hereby incorporated herein by reference, and may be employed in the practice of the invention.

The invention relates to the use of innovative curable materials comprising reaction products containing urethane groups and obtainable from silyl polyethers and compounds bearing isocyanate groups, for surface modification and surface coating, for the production of sealants, adhesives and binders, and for polyurethane systems, and also to processes for preparation thereof.

To a person skilled in the art, there are numerous known types of curable materials or reactive prepolymers, tailored to the particular area of application. In all cases, compounds are involved that contain reactive, curable and/or crosslinkable functional groups, such as epoxide, amino, hydroxyl, isocyanate, acrylate, vinyl, allyl or silyl groups, for example. Among these very different types of prepolymers, the moisture-curing systems which bear silyl groups and/or isocyanate groups possess a prominent economic importance.

Among the most important applications of reactive curable materials is their use as adhesives, as sealants, as binders or as modifiers for surfaces.

Modification for the purposes of this invention includes surface coatings as well, which in general are full-area coatings, as in the case of paints and inks, for example, and/or in water repellants.

Similarly diverse are the substrates amenable to surface modification. As well as fairly flat carrier materials such as metals, concrete, plastics, wood or glass, there are solid particles, fibres and, for example, textile fabrics that are surface modified by application of thin layers.

Thus it is prior art to modify surfaces of inorganic particles, macroscopic inorganic surfaces and inorganic fibres, such as those of metal oxides, mixed oxides, nitrides, hydroxides, carbides, carbonates, silicates, pigments, carbon blacks, elements or alloys, for example. Likewise known to a person skilled in the art is the modification of organic particles, natural materials in small-particle form, macroscopic organic surfaces and fibres, such as those of silicone resins, organically modified silicones, organic polymers or biopolymers, for example.

It can be particularly advantageous if the curable material contains at least one functional group which is able to enter into covalent, ionic or coordinative bonds or hydrogen bonds with the surface that is to be modified. These functional groups may be, for example, carboxylic acid groups, OH groups, SH groups, epoxide groups, amino groups, SiOH groups, isocyanate groups or hydrolysable alkoxysilanes.

It is of particular advantage if at the same time, on the surface of the substrate, there are functional groups present such as hydroxyl groups, SH groups, amino groups or, for example, carboxylic acid groups, with the result that there may be intensive physical interactions developed or else there are chemical reactions between reactive functional groups of the curable material with those on the substrate surface. In this way the curable material is anchored permanently to the substrate in question.

The type of anchor group in the curable material must be tailored in each case precisely to the nature and the type of the reactive functional groups of the substrate surface. Important further selection criteria for the choice of most suitable curable material are the pH, moisture content or porosity of the substrate in question.

Consequently, rather than one chemical system which can be used universally for all types of surfaces, there are a multiplicity of classes of compound which bear reactive groups and which are employed for surface modification. The prior art lists, for example, reactive monomeric and polymeric isocyanate-, epoxide-, acrylate-, silane-, carboxylate-, amine-, hydroxyl- and mercapto-functional compounds, which are each fixed on the substrate in different chemical/physical ways depending on the substrate.

An important part as sealants, adhesives, binders and/or coating constituents is played by reactive curable materials, more particularly those which contain moisture-crosslinking isocyanate functions and/or alkoxysilane functions.

Polymers and oligomers prepared from compounds bearing isocyanate groups by reaction with hydroxyl- or amino-functional compounds are known in great chemical diversity. Depending on the stochiometry of the reaction and the nature of the starting compounds, this produces prepolymers which contain urethane and/or urea groups and, terminally, bear reactive isocyanate, hydroxyl or amine groups, and which in synthesis can either be reacted further in a subsequent step or else frequently can be used as crosslinkable base materials for adhesives and sealants or else as coating materials.

Particularly widespread and of economic importance are isocyanate-terminated urethane prepolymers which are formed through the reaction of a polyether polyol with molar excesses of an organic diisocyanate monomer, and in which, if desired, the excess diisocyanate monomer is removed by distillation. Based on such prepolymers, for example, are the specifications GB 1,101,410 and U.S. Pat. No. 5,703,193, U.S. Pat. No. 4,061,662, U.S. Pat. No. 4,182,825, U.S. Pat. No. 4,385,171, U.S. Pat. No. 4,888,442 and U.S. Pat. No. 4,288,577.

The introduction of urethane groups into the prepolymer structure allows the known high resistance of the polyurethanes to solvents, chemicals and effects of weathering, and their high mechanical flexibility, to be transposed to the isocyanate-based sealants and adhesives. Besides the polyurethane prepolymers which bear NCO groups, there are also silane-terminated polyurethanes known which according to the prior art no longer contain any free NCO groups. Reacting an isocyanate prepolymer with alkoxysilanes bearing, for example, amino groups produces urea groups as a link between the prepolymer and the actual desired curable terminal alkoxysilyl groups.

Alkoxysilane-functional polyurethanes may be prepared in accordance with U.S. Pat. No. 3,627,722 or U.S. Pat. No. 3,632,557, by reaction, for example, of polyether polyols with an excess of polyisocyanate to give an NCO-containing prepolymer, which is then further reacted in turn with an amino-functional alkoxysilane.

DE 10 2005 041954 A1 (US 2007-0055010) describes urethane prepolymers which contain alkoxysilyl groups, which are allophanate-modified, and whose allophanate structure contains a moisture-curing silane-functional radical.

The teaching of DE 10 2006 054 155 (US 2010-0078117) provides for the addition of free silanes as additional components to the trialkoxysilyl units already represented in the copolymer structure; these free silanes take on the function of water scavenges (improving shelf life), crosslinkers, reactive diluents or, for example, adhesion promoters.

Dow Chemical, in U.S. Pat. No. 6,162,862, describes polyfunctional, liquid, urethane-containing adducts which in addition to an isocyanate function may also include a silyl function, as surface coating materials and paint constituents.

Disadvantageous in the sense of good substrate adhesion of the adhesive bond, of the sealant or, for example, of the surface coating material is the low density of functionalization of the prior-art prepolymers terminated with silyl groups only in α,ω-position. The known isocyanate prepolymers as well have crosslinkable NCO groups at their chain ends only.

The use of alkoxysilane-functional prepolymers for preparing silane-crosslinking rigid foams and flexible foams, especially isocyanate-free, sprayable assembly foams, is known and is described in EP 1 098 920 B1 or EP 1 363 960 B1 (U.S. Pat. No. 7,674,840), for example. These spray foams are typically applied from pressurized cans and serve generally to fill and seal cavities in a construction.

DE 10 2006 054 155 (US 2010-0078117) teaches a method of adhesively bonding surfaces that uses foamable mixture of silane-terminated prepolymers and blowing agent.

Alkoxysilane-terminated, moisture-curing, one-component polyurethanes are increasingly being used as flexible coating, sealing and bonding compositions in construction and in the automotive industry.

Surface modifiers or curable materials, sealants and adhesives comprising compounds which bear silane groups can be applied in pure form, in solution in an organic solvent, in formulations or else as an aqueous emulsion. Emulsions of silylated prepolymers are subject matter of a multiplicity of specifications. Specification DE 2558653 describes emulsions comprising self-emulsifying polyurethanes bearing silyl groups, and their use for the coating of surfaces. Specification JP 1318066 describes aqueous emulsions of silylated polyethers which may further comprise colloidal silica. DE 4215648 discloses storage-stable contact adhesives based on solutions or emulsions of cationically modified, alkoxysilane-terminated polyurethanes.

In widespread use are low-viscosity monomeric alkoxysilane compounds of the formula (1),

$$U_x SiV_{(4-x)} \quad (1)$$

where U represents identical or different groups which are non-hydrolysable in the presence of water and optionally catalyst, and V represents identical or different groups which are hydrolysable in the presence of water and optionally catalyst, or hydroxyl groups, and x represents 1, 2, 3 or 4. Such compounds include, for example, those bearing the trimethoxysilyl and triethoxysilyl groups.

So-called α-silane-terminated polymers, whose reactive alkoxysilyl group is separated only by one methylene unit from a urethane group, are described by WO 2005/100482 and EP-A1-1 967 550 (US 2009-0088523).

Also known are silane polymers in which the silane groups are separated terminally by a propylene unit from a urethane group to which a polymer backbone is attached. Preference in this context is given to polyalkylene oxides, especially polypropylene glycols having silane functions on each of the two chain ends, as described in EP-A1-1 824 904 (US 2009-0264612).

Likewise known are silane-terminated polyurethanes, whose preparation from a polyol by reaction with a diisocyanate and, subsequently, with an amino-functional alkoxysilane is described in U.S. Pat. No. 7,365,145, U.S. Pat. No. 3,627,722 or U.S. Pat. No. 3,632,557, for example. The linking group in this case is a radical which bears urethane groups and urea groups.

The skilled person also knows of urethane-free and urea-free, silyl-terminated polyethers, in which the terminal alkoxysilyl groups are attached via an ether function directly to the polymer backbone, as described in U.S. Pat. No. 3,971,751. They are composed preferably of a polyether backbone and are available as MS Polymer® products from Kaneka. Polysiloxanes bearing alkoxysilyl groups, too, as described in WO 2007/061847 (US 2008-0306208), for example.

Known, furthermore, are hydroxyl compounds which bear alkoxysilyl groups and are prepared by alkoxylating epoxy-functional alkoxysilanes over double metal cyanide (DMC) catalysts in accordance with the as yet unpublished specification DE 10 2008 000360.3 (U.S. Ser. No. 12/389,667). Their use as optionally foamable adhesives and sealants, and also coating materials, is described in the as yet unpublished specification DE 10 2008 043218.0 (U.S. Ser. No. 12/561, 599). The as yet unpublished specification DE 10 2009 022628.1 (U.S. Ser. No. 12/630,125) discloses methods of modifying sheet and particle surfaces by means of hydroxyl compounds bearing silyl groups. The as yet unpublished specification DE 10 2009 022627.3 (PCT/EP2010/055508) describes the use of the polyethers obtained from epoxy-functional alkoxysilanes as ceramic binders, especially for producing refractory materials. Also known is the preparation, as disclosed in the as yet unpublished specification DE 10 2009 022630.3 (PCT/EP2010/055495), of aqueous emulsions and their applications as raw materials, for example, for paints, adhesives, cosmetic products, coatings, architectural preservatives, and sealants. As set out in the as yet unpublished specification DE 10 2009 022631.1 (PCT/EP2010/ 055502), curable compositions of the silyl polyethers prepared in accordance with DE 10 2008 000360.3 (U.S. Ser. No. 12/389,667) are also known, as is their application as base materials for the preparation of adhesives and sealants, for surface coating and surface modification, as reactive crosslinkers, as adhesion promoters, spreaders and, for example, primers.

In view of the high molecular mass construction, the silyl modification of the polymers is not sufficient to ensure the desired good substrate adhesion. Accordingly, the teaching of DE 10 2006 054 155 (US 2010-0078117) refers to the option of adding free silanes to the PU matrix in order to bring forth the desired effects discussed at the outset (promotion of adhesion, drying, crosslinking, and the like). This by no means ensures the targeted installation of silane anchor groups at those locations in the polymer that require their positive effect.

There is therefore demand for a technically simple, reliable and, in particular, reproducible process. The known processes are lacking in freedom to provide access, away from the known α,ω-functionalization principle, to prepolymer structures which possess a molecular presence of curable moieties (i.e. sum of isocyanato functions and silyl functions per molecule) of more than 2 and, furthermore, an opportunity for choice, at the desire of the synthetic chemist, to tailor the ratio of the curable moieties (isocyanato/alkoxysilyl functions) to one another to the target performance requirements, within wide ranges.

Moreover, it is a deficiency known to the skilled person that conventional silyl-terminated polyurethanes, owing to the high viscosity which they have as a result of their chemical construction, are restricted in their possible applications, as emphasized in U.S. Pat. No. 7,365,145. This is so in particular when, in the field of sealant and adhesive systems, conventional amounts of 30-50% by weight of inorganic fillers such as calcium carbonate or silicates are added. In accordance with the prior art, therefore, diluents are added to polymers of this type. These may be either reactive diluents, which not only lower the viscosity but also raise the crosslinking density at the same time, such as monomeric alkoxy silanes, or may be non-reactive diluents or solvents, which may additionally have plasticizing properties. One typical representative of this class of silyl-terminated polyurethanes is, for example, Desmoseal® S XP 2636 from Bayer Material Science, having a viscosity of around 40 000 mPas (23° C.).

Using targeted allophanatization, the prior art attempts to counteract the high viscosities, which are a result of strong intermolecular hydrogen bonds and dipolar interactions between the urethane and, where present, urea units, but without being able to eliminate the deficit represented by the low crosslinking density.

WO 2007/025667 (US 2007-0055010) describes modified polyurethane prepolymers which contain alkoxysilane groups and are said to have a significantly reduced viscosity. A disadvantage, however, is the relatively low density of crosslinkable silyl groups.

With acknowledgement of the state of the art as set out herein, the technical problem to be solved is defined as that of providing innovative sealants and adhesives, binders and modifiers, comprising silylated prepolymers containing urethane groups, which, through comparatively lower viscosities, avoid the disadvantages of alkoxysilane-modified polyurethane prepolymers described.

The problem is solved by means of innovative curable materials comprising reaction products of alkoxysilyl compounds and isocyanates.

The present invention accordingly provides innovative curable materials comprising urethane-group-containing (pre)polymers and/or reaction products, obtainable through the reaction of
a) at least one compound containing one or more isocyanate groups with
b) at least one compound bearing one or more alkoxysilyl groups and additionally bearing at least one hydroxyl group,
c) optionally in the presence of one or more catalysts,
d) optionally in the presence of further components reactive towards the reaction products, more particularly those components which possess functional groups having protic hydrogen, such as, for example, alcohols, amines, thiols, organofluorine hydroxy compounds, alkoxysilanes and/or water,
e) optionally in the presence of further compounds which are not reactive towards the reaction products and reactants, such as, for example, solvents, process assistants and/or suspension agents, and also preparations comprising these curable materials.

The present invention accordingly provides curable materials comprising urethane-group-containing polymer preparations, obtainable through the reaction of one or more compounds containing isocyanate groups with one or more compounds bearing alkoxysilyl groups and hydroxyl groups.

In one preferred embodiment the component (a) containing isocyanate groups bears no alkoxysilyl and/or alkylsilyl groups.

Preferred curable materials comprise alkoxysilyl-modified, urethane-group-containing reaction products which are characterized in that, based on the individual molecule of the reaction product, there is on average more than 1 alkoxysilyl group per urethane group or reaction derivatives thereof, such as, for example allophanates and/or biuret groups or else urea groups. As component b) it is preferred to use silyl polyethers of the formula 1 having an index d of greater than or equal to 1.

The invention further provides for the use of the urethane-group-containing curable materials as a constituent of curable sealants and adhesives, binders and modifiers, and the thus-prepared sealants and adhesives, binders and modifiers themselves, it being possible for the alkoxysilyl groups to be present, optionally, singly or multiply, and terminally or within the polymer chain, and it also being possible, optionally, for additional isocyanate groups to be present terminally.

By virtue of their application properties such as reactivity, crosslinking density, adhesion, mechanical properties and, for example, viscosity, the resultant innovative sealants and adhesives, binders and modifiers allow flexible attachment via the polymer structure to the particular substrate to be modified or to the surfaces to be bonded or to be sealed.

A particular feature of these innovative sealants and adhesives, binders and modifiers is that they can optionally be modified further not only via the isocyanate groups and/or hydroxyl groups they contain but also via the alkoxysilyl groups that are incorporated in them.

A further aspect of this invention involves providing a technically simple and economic process for preparing these new sealants and adhesives, binders and modifiers. This invention provides urethane-group-containing, innovative sealants and adhesives, binders and modifiers which are obtained through the reaction of one or more compounds containing isocyanate groups with one or more compounds bearing alkoxysilyl and hydroxyl groups, especially silyl polyethers 1 (formula 2).

A silyl group for the purposes of this invention is characterized in that as well as at least one alkoxy function it has one or two alkyl functions or one or two further alkoxy functions on a silicon atom, and the organic or oxyorganic groups present in these radicals may be alike or different.

The preparation of the silyl polyethers 1, and the types of epoxide structure that can be used, are described comprehensively in DE 10 2008 000360.3, unpublished at the priority date of the present specification, and, accordingly, can be prepared by alkoxylating epoxy-functional alkoxysilanes over double metal cyanide catalysts, for example. Reference is hereby made to the content of the description and claims of DE 10 2008 000360.3 in their entirety, and the aforementioned specification is considered to be part of the present disclosure.

The invention therefore further provides a curable material, comprising as component (b) one or more silyl polyethers 1 of the formula 2:

(2)

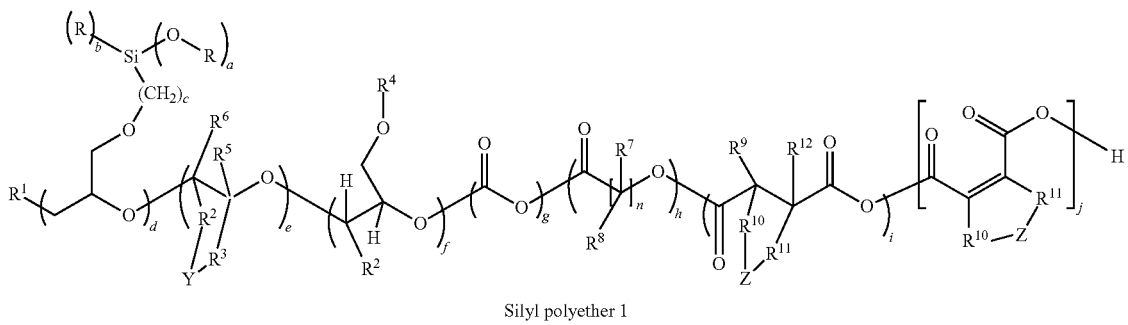

Silyl polyether 1 where
a is an integer from 1 to 3, preferably 3,
b is an integer from 0 to 2, preferably 0 to 1, more preferably 0, and the sum of a and b is 3,
c is an integer from 0 to 22, preferably from 0 to 12, more preferably from 0 to 8, very preferably from 0 to 4, and more particularly 1 or 3,
d is an integer from 1 to 500, preferably 1 to 100, more preferably 2 to 20, and with particular preference 2 to 10,
e is an integer from 0 to 10 000, preferably 1 to 2000, more preferably 2 to 2000, and more particularly 2 to 500,
f is an integer from 0 to 1000, preferably 0 to 100, more preferably 0 to 50, and more particularly 0 to 30,
g is an integer from 0 to 1000, preferably 0 to 200, more preferably 0 to 100, and more particularly 0 to 70,
h, i and j independently of one another are integers from 0 to 500, preferably 0 to 300, more preferably 0 to 200, and more particularly 0 to 100,
n is an integer between 2 and 8, and with the proviso that the fragments having the indices d to j are freely permutable with one another, i.e. exchangeable for one another in the sequence within the polyether chain, and
R is one or more identical or different radicals selected from linear or branched, saturated, singly or multiply unsaturated alkyl radicals having 1 to 20, more particularly 1 to 6 carbon atoms or haloalkyl groups having 1 to 20 carbon atoms. Preferably R corresponds to methyl, ethyl, propyl, isopropyl, n-butyl and sec-butyl groups; and also
$R^1$ is a hydroxyl group or a saturated or unsaturated linear, branched or cyclic or further-substituted oxyorganic radical having 1 to 1500 carbon atoms, it also being possible for the chain to be interrupted by heteroatoms such as O, S, Si and/or N, or a radical comprising an oxyaromatic system, preferably an alkoxy, arylalkoxy or alkylarylalkoxy group and more particularly a polyether radical, in which the carbon chain may be interrupted by oxygen atoms, or a singly or multiply fused oxyaromatic group or an optionally branched, silicone-containing organic radical,
$R^2$ or $R^3$, and also $R^5$ or $R^6$, are, identically or else independently of one another, H and/or a saturated or optionally singly or multiply unsaturated, including further-substituted, optionally monovalent or polyvalent hydrocarbon radical, the radicals $R^5$ or $R^6$ being a monovalent hydrocarbon radical. The hydrocarbon radical may be bridged cycloaliphatically via the fragment Y; Y may be absent, or else may be a methylene bridge having one or two methylene units; if Y is absent, then $R^2$ or $R^3$ independently of one another are a linear or branched radical having 1 to 20, preferably 1 to 10 carbon atoms, more preferably a methyl, ethyl, propyl or butyl, vinyl, allyl radical or phenyl radical.

Preferably at least one of the two radicals, $R^2$ or $R^3$, is hydrogen. $R^2$-$R^3$ may be a —$CH_2CH_2CH_2CH_2$ group, and Y therefore a —($CH_2CH_2$—) group. The hydrocarbon radicals $R^2$ and $R^3$ may in turn be further substituted and may carry functional groups such as halogens, hydroxyl groups or glycidyloxypropyl groups.
$R^4$ independently at each occurrence is a linear or branched alkyl radical of 1 to 24 carbon atoms or an aromatic or cycloaliphatic radical, which optionally may in turn carry alkyl groups;
$R^7$ and $R^8$ are independently of one another either hydrogen or alkyl, alkoxy, aryl or aralkyl groups,
$R^9$, $R^{10}$, $R^{11}$ and $R^{12}$ are independently of one another either hydrogen or alkyl, alkenyl, alkoxy, aryl or aralkyl groups. The hydrocarbon radical may be bridged cycloaliphatically or aromatically via the fragment Z, it being possible for Z to represent a divalent alkylene radical or else alkenylene radical,
with the proviso that the fragments having the indices d, e, f and/or h are freely permutable with one another, i.e. are interchangeable with one another within the polyether chain and may be present alternatively with statistical distribution or blockwise sequencing, and hence are interchangeable with one another in the sequence within the polymer chain.

Preferred silyl polyethers 1 are those in which the sum of the fragments d to j is greater than or equal to 3, if $R^1$ is composed only of one monomer or oligomer.

In the absence of a nomenclature which describes their composition specifically, the compounds of the formula (2) are referred to below as silyl polyethers 1, even if the structure may not encompass the features of a polymeric ether in the conventional sense. For the skilled person, however, the structural coincidence of polyether structural elements with those of the silyl polyethers 1 is clearly and distinctly apparent.

In the context of this invention, the term "polyethers" embraces not only polyethers, polyetherols, polyether alcohols and polyether esters but also polyether carbonates, which, where appropriate, are used synonymously with one another. In such cases it is not necessary for the expression "poly" to necessarily imply that there are a multiplicity of ether functionalities or alcohol functionalities present in the molecule or polymer. Instead, this expression merely indicates that there are at least repeating units of individual monomer building blocks or else compositions which have a relatively high molar mass and also, furthermore, a certain polydispersity.

The word-fragment "poly" in connection with this invention encompasses not only exclusively compounds having at least three repeating units of one or more monomers in the molecule, but also, in particular, those compositions of compounds which have a molecular weight distribution and possess an average molecular weight of at least 200 g/mol. This definition takes account of the circumstance that, within the field of art under consideration, it is customary to designate even compounds of this kind as polymers, even when they do not appear to satisfy the definition of a polymer along the lines of OECD or REACH guidelines (e.g. European Regulation No. 1907/2006).

$R^1$ is a fragment which comes from the starter, or starter compounds, for the alkoxylation reaction, as per formula (3)

(the H belongs to the OH group of an alcohol or phenolic compound); starters of the formula (3) may be used alone or in mixtures with one another, and have at least one reactive hydroxyl group; hence the starter may also be water.

OH-functional starter compounds $R^1$—H (3) used are preferably compounds having molar masses of 18 (water) to 10 000 g/mol, more particularly 50 to 2000 g/mol, and having 1 to 8, preferably 1 to 4, hydroxyl groups.

Preferred starters of the formula (3) used are those in which $R^1$ is a hydroxyl group or a saturated or unsaturated linear, branched or cyclic or further-substituted oxyorganic radical having 1 to 1500 carbon atoms, which if desired may also be interrupted by heteroatoms such as O, S, Si or N, or a radical comprising an oxyaromatic system; preferably $R^1$ is an alkoxy, arylalkoxy or alkylarylalkoxy group and more particularly a polyether radical, in which the carbon chain may be interrupted by oxygen atoms, or a singly or multiply fused oxyaromatic group or an optionally branched, silicone-containing organic radical.

Furthermore, $R^1$—H may represent an oxyalkyl-functional siloxane or an oxy-functional polyethersiloxane.

The chain length of the polyether radicals containing alkoxy, arylalkoxy or alkylarylalkoxy groups that can be used as a starter compound is arbitrary. The polyether, alkoxy, arylalkoxy or alkyarylalkoxy group contains preferably 1 to 1500 carbon atoms, more preferably 2 to 300 carbon atoms, more particularly 2 to 100 carbon atoms.

The compounds of the formula (3) are preferably selected from the group of the alcohols, polyetherols or phenols. As starter compound it is preferred to use a monohydric or polyhydric polyether alcohol or alcohol $R^1$—H (the H belongs to the OH group of the alcohol or phenol) or else water.

As starter compounds (3) it is advantageous to use low molecular mass polyetherols having 1 to 8 hydroxyl groups and molar masses of 50 to 2000 g/mol, which have in turn been prepared beforehand by DMC-catalyzed alkoxylation. Examples of compounds of the formula (3) include water, allyl alcohol, butanol, octanol, dodecanol, stearyl alcohol, 2-ethylhexanol, cyclohexanol, benzyl alcohol, ethylene glycol, propylene glycol, di-, tri- and polyethylene glycol, 1,2-propylene glycol, di- and polypropylene glycol, 1,4-butanediol, 1,6-hexanediol, trimethylolpropane, glycerol, pentaerythritol, sorbitol, cellulose sugars, lignin or else other hydroxyl-bearing compounds based on natural substances.

Suitability is possessed, besides compounds having aliphatic and cycloaliphatic OH groups, by any compounds having 1 to 20 phenolic OH functions. These include, for example, phenol, alkylphenols and arylphenols, bisphenol A and novolaks.

The compounds thus prepared provide the freedom in synthesis to choose between polyoxyalkylene compounds containing alkoxysilyl groups that contain the alkoxysilyl functions either terminally, or in isolation, in blockwise cumulation, or else scattered statistically into the polyoxyalkylene chain.

A feature of the silyl polyethers 1 of the formula (2) is that in terms of construction and molar mass they can be prepared targetedly and reproducibly. The sequence of the monomer units can be varied within wide limits. Epoxide monomers may be incorporated into the polymer chain as desired, in blockwise sequence or randomly. The fragments inserted into the polymer chain that forms, as a result of the reaction involving ring opening of the reaction components, are freely permutible between one another in terms of their sequence, subject to the restriction that cyclic anhydrides and also carbon dioxide are present in random insertion, in other words not in homologous blocks, in the polyether structure.

Silyl polyethers of the formula (2) are composed of alkoxysilyl group substituted chains which, as a result of the choice of the fragments d to j, corresponding to the fragments inserted into the polymer chain as a result of the reaction involving ring opening of the reaction components, are specifically highly functionalized and can therefore be tailored for different kinds of fields of application.

The index numbers given in the formulae set out here, and the value ranges of the indices specified, are therefore to be understood as the average values of the possible statistical distribution of the structures and/or mixtures thereof that are actually present. The same applies to structural formulae which per se are reproduced exactly, such as, for example, to formula (2) and/or (3).

Depending on the epoxide-functional alkoxysilane and any further monomers employed, and also, possibly, carbon dioxide, it is possible for ester-modified or carbonate-modified silyl polyethers to be obtained. The alkoxysilyl unit in the compound of the formula (2) is preferably a trialkoxysilyl unit.

As shown by $^{29}$Si-NMR and GPC investigations, the process-related presence of OH groups in chain-end positions provides the possibility for transesterification reactions on the silicon atom not only during the DMC-catalyzed preparation but also, for example, in a downstream operating step. In such reactions, formally, the alkyl radical R attached to the silicon by an oxygen atom is replaced by a long-chain modified alkoxysilyl polymer radical. Bimodal and multimodal GPC curves demonstrate that the alkoxylation products include not only the untransesterified species, as shown in formula (2), but also those having twice, in some cases three times, or even four times the molar mass. Formula (2), accordingly, shows only a simplified version of the complex chemical reality.

The silyl polyethers 1, accordingly, represent compositions which also comprise compounds in which the sum of the indices (a) plus (b) in formula (2) is on average less than 3, since some of the OR groups may be replaced by silyl polyether groups. The compositions thus comprise species which are formed on the silicon atom, with elimination of R—OH and condensation reaction with the reactive OH group of a further molecule of the formula (2). This reaction may take place a number of times, until, for example, all of the RO groups on the silicon have been replaced by further molecules of the formula (2). The presence of more than one signal in typical $^{29}$Si-NMR spectra of these compounds underlines the occurrence of silyl groups with different substitution patterns.

The values and ranges of preference that are specified for the indices (a) to (j) are therefore also to be understood only as average values over the different, individually undeterminable species. The diversity of chemical structures and molar masses is also reflected in the broad molar mass distributions that are typical of silyl polyethers 1 and are entirely unusual for conventional DMC-based polyethers, vis molar mass distributions $M_w/M_n$ of usually ≥1.5.

In the case of the prior-art methods, only silyl-group-terminated prepolymers can be formed. The silyl polyethers 1 used as a reactive component differ from oligomers or polymers modified by conventional methods in that, as a result of the deliberate chain construction and the variable insertion of functional groups in both blocklike and isolated manner, structures are formed which on the one hand have silyl functionalization scattered or distributed in blocks across the entire chain, while, on the other hand, may—but need not necessarily—carry silyl functionalization at the ends as well.

Inseparably connected with the process for alkoxylating epoxy-functional alkoxysilanes that is set out in the as yet unpublished specification DE 10 2008 000360.3 is the feature that at the ends there is always an OH functionality present, originating from the epoxide ring opening of the last epoxide monomer in each case, with attachment to the OH-functional end of the growing chain. It is this same terminal OH functionality of the silyl polyethers, used here as a reactive component, that opens the way for their further functionalization with compounds containing isocyanate groups, with formation of a urethane linkage.

Suitable isocyanate-group-containing compounds include all known isocyanates. Preference in the sense of the teaching according to the invention is possessed, for example, by aromatic, aliphatic and cycloaliphatic polyisocyanates having a number-average molar mass of below 800 g/mol. Suitable examples thus include diisocyanates from the series consisting of 2,4-/2,6-toluene diisocyanate (TDI), methyldiphenyl diisocyanate (MDI), triisocyanatononane (TIN), naphthyl diisocyanate (NDI), 4,4'-diisocyanatodicyclohexylmethane, 3-isocyanatomethyl-3,3,5-trimethylcyclohexyl isocyanate (isophorone diisocyanate=IPDI), tetramethylene diisocyanate, hexamethylene diisocyanate (HDI), 2-methylpentamethylene diisocyanate, 2,2,4-trimethylhexamethylene diisocyanate (THDI), dodecamethylene diisocyanate, 1,4-diisocyanatocyclohexane, 4,4'-diisocyanato-3,3'-dimethyldicyclohexylmethane, 2,2-bis(4-isocyanatocyclohexyl)propane, 3-isocyanatomethyl-1-methyl-1-isocyanatocyclohexane (MCI), 1,3-diisooctylcyanato-4-methylcyclohexane, 1,3-diisocyanato-2-methylcyclohexane and α,α,α',α'-tetramethyl-m- or -p-xylylene diisocyanate (TMXDI), and also mixtures of these compounds.

Preferred starting materials for the preparation of the compounds containing urethane groups are hexamethylene diisocyanate (HDI), isophorone diisocyanate (IPDI) and/or 4,4'-diisocyanatodicyclohexylmethane.

Likewise suitable as isocyanate-containing starting components are reaction products of the aforementioned isocyanates with themselves or with one another to form uretidiones or isocyanurates. Examples include Desmodur® N3300, Desmodur® N3400 or Desmodur® N3600 (all Bayer MaterialScience, Leverkusen, Del.).

Also suitable, in addition, are derivatives of isocyanates, such as allophanates or biurets. Examples include Desmodur® N100, Desmodur® N75MPA/BA or Desmodur® VPLS2102 (all Bayer MaterialScience, Leverkusen, Del.). Where polyisocyanates of this kind are reacted with silyl polyethers having more than one reactive OH group in the molecule, linear or branched copolymers are formed in which the silyl polyether fragments and isocyanate fragments are linked with one another in alternation via urethane groups. Where the isocyanate component is used in a molar excess over the silyl polyether component, the products are reactive prepolymers which terminally carry NCO groups and have additional alkoxysilyl functionality. Through ongoing reaction on the urethane groups with isocyanates it is possible, furthermore, to construct allophanate structures and to build additional branches into the backbone of the prepolymers.

Where, in the other case, the silyl polyether 1 is used in excess, urethanized polyols are formed which carry alkoxysilyl groups and have terminal OH groups.

The silyl polyethers 1 can also be modified with monofunctional isocyanates. In the simplest case, alkyl, aryl and/or arylalkyl isocyanates are reacted with the OH groups of the silyl polyether, forming the respective adduct and at the same time endcapping the reactive chain end of the silyl polyether employed. Suitability for this purpose is possessed, for example, by methyl, ethyl, butyl, hexyl, octyl, dodecyl and stearyl isocyanate. Particularly suitable monofunctional isocyanates are those which in turn carry crosslinkable alkoxysilyl groups in the molecule. They include, preferably, isocyanatoalkyltrialkoxysilanes and isocyanatoalkylalkyldialkoxysilanes.

Alkoxysilane-functional monoisocyanates which can be used include isocyanatotrimethoxysilane, isocyanatomethyltriethoxysilane, (isocyanatomethyl)methyldimethoxysilane, (isocyanatomethyl)methyldiethoxysilane, 3-isocyanatopropyltrimethoxysilane, 3-isocyanatopropylmethyl-dimethoxysilane, 3-isocyanatopropyltriethoxysilane and 3-isocyanatopropylmethyldiethoxysilane. Preference here is given to the use of 3-isocyanatopropyltrimethoxysilane and -triethoxysilane.

By this chemical pathway it is possible to obtain modified silyl polyethers which are endowed terminally by one additional alkoxysilyl group in each case. The reaction of alkoxysilane-functional monoisocyanates has been known to date only for conventional OH-functional polymers such as polyethers which themselves contain no alkoxysilyl groups. Processes and products of this kind are described in, for example, the publications below.

For the skilled person it is completely surprising that the curable prepolymers containing urethane groups that are present in the curable materials of the invention have considerably lower viscosities in direct comparison with prior-art compounds of analogous molecular weight, as are disclosed, for example, for the Desmoseal® products in a brochure from Bayer MaterialScience having the title "Prepolymers: Products and Applications", Reported therein are viscosities of 35 000 mPas.

The adhesives and sealants, binders and modifiers of the invention may be modified chemically by follow-on reactions on the NCO and/or alkoxysilyl functions, as for example by reaction with monofunctional or polyfunctional alcohols, such as methanol, ethanol, butanol, glycerol, trimethylolpropane, 2-ethylhexyl alcohol or fluorinated alcohols, such as 2,2,2-trifluoroethanol, or acrylated alcohols, such as hydroxyethyl acrylate, hydroxypropyl acrylate or hydroxybutyl acrylate, or polyetherdiols or polyesterdiols or polytetrahydrofuran, and also by reactions with silicone polyether copolymers which have OH-functional polyether radicals, amino-functional polymers such as polyethers and polysiloxanes, or 3-aminopropyltrialkoxysilanes, generally amines, alkoxysilanes, organic acid chlorides, organofluorine compounds, etc., in order to produce or reinforce particular properties of the curable prepolymer. In this way it is possible if desired to introduce further functional groups into the molecule.

Also possible by this means is the targeted influencing of the molar mass and/or viscosity of the products. Hence it is possible to realize average molar masses within a wide range from 500 g/mol to more than 100 000 g/mol.

The urethane-group-containing adhesives, sealants, binders and modifiers of the invention are prepared by reaction of one or more isocyanates with one or more silyl polyethers 1. In the preparation process, some or all of the OH functions of the silyl polyethers 1 are reacted with isocyanate groups, producing—according to starting material and stochiometry—optionally OH-functional or NCO-functional or terminally capped, urethanized curable prepolymers. Dual-cure systems as well can be obtained in this way, which can be cured simultaneously or in succession by crosslinking reactions on the two types of reactive groups.

It may be necessary to bear in mind that some of the NCO functions are reacted through side reactions, as in the formation of allophanates, for example.

The curable materials of the invention comprising urethanized and silylated polymers may comprise further components that carry reactive groups. Such components include all compounds having at least one isocyanate, hydroxyl, amino, epoxy and unsaturated C=C group, such as acrylates, methacrylates, vinyl compounds and allyl compounds, for example.

On the basis of their hydrolysis-sensitive and readily crosslinking alkoxysilyl and optionally isocyanate groups, the adhesives, sealants, binders and modifiers of the invention constitute curable polymers. Their crosslinking to solid end products is accomplished in a simple way in the presence of water and, optionally, with addition of acid or base as accelerant, the pot life being controllable by an increase in temperature during the curing procedure. The polymer construction of these crosslinkable urethane polymers can be varied in a multitude of ways in order to tailor performance properties in the product to the particular end use. Hence it is possible, by varying the fraction of alkoxysilane units in the polymer chain, to influence the crosslinking density and hence the mechanical and physicochemical profile of properties of the cured polymers within wide boundaries. Here, surprisingly, even products equipped with a considerable density of alkoxysilyl functionalization are generally liquids which are easy to handle, and so, even in the case where highly crosslinked, well-adhering adhesive bonds are aimed for, there are no restrictions at all on the application of these components. This observation distinguishes the teaching of the invention from the procedure set out in DE 10 2006 054 155 (US 2010-0078117), which is based on the introduction of free silane monomers as formulating constituents into the end formulas, in order to ensure that the necessary crosslinking density is achieved in conjunction with low processing viscosity. The curable urethanized polymers containing alkoxysilyl groups, which are subject to virtually no limits in terms of their structural diversity, open up a path to the skilled polymer chemist, through the incorporation, for example, of ester, carbonate and aromatic structural elements in the silyl polyether 1 and through the variation of the isocyanate component, to a design freedom which addresses virtually any performance needs.

As the skilled person is aware, the crosslinking or curing of alkoxysilyl groups takes place in a two-stage chemical process in which, in a first step, in the presence of water—atmospheric moisture may also suffice—the alkoxy groups attached to the silicon are eliminated in the form of corresponding alcohols, and SiOH groups are formed. The latter condense in the case of self-condensation subsequently, with formation of Si—O—Si bridges with one another, and form polymeric materials. Alternatively the SiOH-functional intermediates react with substrates containing reactive groups—for example, they react particularly well with OH-functional silicatic surfaces—and lead to excellent chemical anchoring on the substrate in question. The rate of cure can be influenced in a diversity of ways through addition of catalysts or through temperature variation. Where the silane prepolymer additionally contains NCO groups, the possibility exists for the curing thereof in the presence, for example, of OH-functional compounds such as water, alcohols, diols, polyols, polyetherols, aromatic hydroxyl compounds and/or amines, diamines, polyamines.

As a further reactive component it is possible to use amines, which on the one hand may participate in curing, with formation of urea groups, and on the other hand may have a catalytic effect in relation to the crosslinking of the alkoxysilyl groups.

As catalysts for the crosslinking and/or curing and also for the chemical fixing of the alkoxysilyl prepolymers bearing urethane groups on particle surfaces and macroscopic surfaces it is possible to use the known polyurethanization, allophanatization or biuretization catalysts, which are known per se to the skilled person, and/or the catalysts that are known from the literature and are commonly used for the hydrolysis and condensation of alkoxysilanes. They include compounds such as, for example, the zinc salts zinc octoate, zinc acetylacetonate and zinc(II) ethylcaproate, or tetraalkylammonium compounds, such as N,N,N-trimethyl-N-2-hydroxypropylammonium hydroxide, N,N,N-trimethyl-N-2-hydroxypropylammonium-2-ethylhexanoate or choline 2-ethylhexanoate. Preference is given to using zinc octoate (zinc(II) ethylhexanoate) and the tetraalkylammonium compounds, more preferably to using zinc octoate. It is additionally possible as catalysts to use the organotin compounds that are commonly employed, such as dibutyltin dilaurate, dioctyltin dilaurate, dibutyltin diacetylacetonate, dibutyltin diacetate or dibutyltin dioctoate, etc., for example. Furthermore, it is also possible for bismuth catalysts, an example being the Bor-chi catalyst, titanium compounds, e.g. titanium(IV) isopropylate or titanyl acetylacetonate, iron(III) compounds, e.g. iron(III) acetylacetonate, aluminium compounds, such as aluminium triisopropylate, aluminium tri-sec-butylate and other alcoholates, and also aluminium acetylacetonate, calcium compounds, such as calcium disodium ethylenediaminetetraacetate or calcium diacetylacetonate, or else amines, e.g. triethylamine, tributylamine, 1,4-diazabicyclo[2.2.2]octane, 1,8-diazabicyclo[5.4.0]undec-7-ene, 1,5-diazabicyclo[4.3.0]non-5-ene, N,N-bis-(N,N-dimethyl-2-aminoethyl)methylamine, N,N-dimethylcyclohexylamine, N,N-dimethylphenylamine, N-ethylmorpholine etc., to be used. Organic or inorganic Brønsted acids as well, such as acetic acid, trifluoroacetic acid, methanesulphonic acid, p-toluenesulphonic acid or benzoyl chloride, hydrochloric acid, phosphoric acid, the monoesters and/or diesters thereof, such as butyl phosphate, (iso)propyl phosphate, dibutyl phosphate etc., are suitable catalysts. It is of course also possible to use combinations of two or more catalysts.

The modifiers and compositions of the invention may also comprise what are called photolatent bases as catalysts, as described in WO 2005/100482. Photolatent bases are preferably organic bases having one or more basic nitrogen atoms, which initially are present in a blocked form and release the basic form through splitting of the molecule only after irradiation with UV light, visible light or IR radiation.

The catalyst or photolatent base is employed in amounts of 0.001% to 10.0% by weight, preferably 0.01% to 1.0% by weight and more preferably 0.05% to 0.5% by weight, based on the modifiers. The catalyst or photolatent base may be added in one portion or else in a plurality of portions or else continuously. It is preferred to add the entire amount in one portion.

Furthermore, the adhesives and sealants, binders and modifiers of the invention may comprise other reactive silanes, preferably alkoxysilanes.

These alkoxysilanes may be both monomeric silanes such as those of the formula (4) and also polymer-bonded silanes, $$U_xSiV_{(4-x)} \qquad (4)$$

where U represents identical or different groups which are non-hydrolysable in the presence of water and catalytic amounts of Brønsted acid at temperatures of up to 100° C., V represents identical or different groups which are hydrolysable in the presence of water and catalytic amounts of Brønsted acid at temperatures up to 100° C., or hydroxyl groups, and x is 1, 2, 3 or 4.

Hydrolysable in the context of this invention means that at least 80% of the groups can be hydrolysed and hence eliminated under the conditions chosen.

The alkyl chain may have 0 to 50, preferably 0 to 22, carbon atoms and may also be interrupted by heteroatoms such as oxygen or nitrogen or sulphur or else may be a silicone radical. The aromatic radical may also be heteroaromatic. The radicals A and B may possibly have one or more customary constituents, such as halogen or alkoxy, for example.

Non-hydrolysable radicals U according to the formula (4) with functional groups may be selected from the area of the glycidyl or glycidyloxyalkylene radicals, such as, for example, β-glycidyloxyethyl, γ-glycidyloxypropyl, δ-glycidyloxypropyl, ε-glycidyloxypentyl, ω-glycidyloxyhexyl or 2-(3,4-epoxycyclohexyl)ethyl, the methacryloyloxyalkylene and acryloyloxyalkylene radicals, such as, for example, methacryloyloxymethyl, acryloyloxymethyl, methacryloyloxyethyl, acryloyloxyethyl, methacryloyloxypropyl, acryloyloxypropyl, methacryloyloxybutyl or acryloyloxybutyl, and the 3-isocyanatopropyl radical, and/or cyclic and/or linear (poly)urethane-group-containing and/or urea-containing and/or (poly)amino-group-containing radicals.

Particularly widespread is the use of low-viscosity, monomeric compounds which carry trimethoxysilyl and triethoxysilyl groups and which, in the presence of atmospheric moisture and suitable catalysts, usually even at room temperature, are capable of undergoing condensation with elimination of the alkoxy groups and formation of Si—O—Si bonds with one another. Organofunctional monomeric silanes of this kind are, for example, N-cyclohexylaminomethyltrimethoxysilane, N-cyclohexyl-3-aminopropyltriethoxysilane, 3-aminopropyltrimethoxysilane, vinyltrimethoxysilane, vinyltriethoxysilane, vinyldimethoxymethylsilane, 3-isocyanatopropyltrimethoxysilane, 3-glycidyloxypropyltrimethoxysilane, 3-glycidyloxypropyltriethoxysilane, 3-methacryloyloxypropyltrimethoxysilane, methyltrimethoxysilane, methyltriethoxysilane, dimethyldimethoxysilane, phenyltriethoxysilane and hexadecyltrimethoxysilane. The methodology is essentially known to the skilled person.

The silylated polymers containing urethane groups can likewise be employed in mixtures with all silyl-functional compounds which have at least one alkoxysilyl group attached chemically to a polymer backbone.

Silane-modified polymers of this kind are silane compounds of the type of the formula (5)

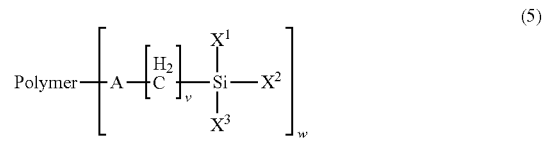

where
$X^1$, $X^2$ and $X^3$ independently of one another are alkyl or alkoxy radicals having 1-8 C atoms,
A represents a carboxyl, carbamate, amide, carbonate, ureido or sulphonate group containing radical or denotes an oxygen atom,
w is an integer from 1 to 8 and
v is an integer from 1 to 20, preferably 1 to 15 and more particularly 1 to 5.

The polymer radical is selected from a group consisting of alkyd resins, oil-modified alkyd resins, saturated or unsaturated polyesters, natural oils, epoxides, polyamides, polycarbonates, polyethylenes, polypropylenes, polybutylenes, polystyrenes, ethylenepropylene copolymers, (meth)acrylates, (meth)acrylamides and salts thereof, phenolic resins, polyoxymethylene homopolymers and copolymers, polyurethanes, polysulphones, polysulphide rubbers, nitrocelluloses, vinyl butyrates, vinyl polymers, ethylcelluloses, cellulose acetates and/or butyrates, rayon, shellac, waxes, ethylene copolymers, organic rubbers, polysiloxanes, polyethersiloxanes, silicone resins, polyethers, polyether esters and/or polyether carbonates.

The polymers of the formula (5) that are used preferably in mixtures with the silyl polymers containing urethane groups include what are called α-silane-terminated polymers, whose reactive alkoxysilyl group is separated only by one methylene unit (v=1) from a nitrogen-containing, polymer-bonded group A, as described in WO 2005/100482 and EP-A1-1 967 550 (US 2009-0088523).

Other silane polymers of the formula (5) which can be used in accordance with the invention in curable compositions are those in which the silane group is attached terminally via a propylene unit (v=3) to a polymer backbone, and in which A represents a urethane group. Preference is given here to polyalkylene oxides, especially polypropylene glycols (w=2), having silane functions on each of the two chain ends, as described in EP-A1-1 824 904 (US 2009-0264612).

Compounds of the formula (5) that are also suitable as mixture constituents are silane-terminated polyurethanes whose preparation from a polyol by reaction with a diisocyanate and subsequently with an amino-functional alkoxysilane is described in, for example, U.S. Pat. No. 7,365,145, U.S. Pat. No. 3,627,722 or U.S. Pat. No. 3,632,557. The linking group A in this case is a radical which carries urethane and urea groups. Other polymers which can be used for the purposes of the invention are urethane-free and urea-free silyl-terminated polyethers of the formula (5) where A is oxygen, in which the terminal alkoxysilyl groups are attached directly to the polymer backbone via an ether function. Silyl polymers of this kind are described in U.S. Pat. No. 3,971,751. They are composed preferably of a polyether backbone where v in formula (5) has a value of preferably 3 and w has a value of preferably 2, and are available as MS Polymer® products from Kaneka.

Polysiloxanes which carry alkoxysilyl groups as well, as described in WO 2007/061847 (US 2008-0306208), for example, can be combined with the urethanized and silylated polymers of the invention.

The invention provides for the use of the curable materials comprising the urethane-group-containing alkoxysilyl prepolymers and, optionally, at least one further alkoxysilane component of formula (4) or (5) as adhesives, sealants, binders or modifiers.

Furthermore, the curable mixtures may comprise one or more isocyanate, hydroxyl and/or amine compounds.

Generally it is left up to the expert to select the components that are suitable for the desired profile of properties, in order to produce copolymer systems with optimum adaptation. Through the compositions according to the invention, accordingly, a construction kit of different profiles of properties is available, from which an optimized selection can be made in order to match the application.

The inventive introduction of urethane groups into the prepolymer structure allows the known properties of the pure polyurethanes, including good adhesion properties on different substrates, high resistance to solvents, chemicals and effects of weathering, and their high mechanical flexibility, to be combined with the advantages of curable silyl polyethers.

Here, surprisingly, even urethanized silyl polyether isocyanate adducts equipped with a considerable density of alkoxysilyl functionalization are generally low-viscosity liquids which are easy to handle, and so, even in the case where highly crosslinked, well-adhering adhesive bonds are aimed for, there are no restrictions at all on the metering of this component. This observation distinguishes the teaching of the invention from the procedure set out in WO 2008/058955 (US 2010-0078117), which is based on the introduction of free silane monomers as formulating constituents into the end formulas, in order to ensure that the necessary crosslinking density is achieved in conjunction with low processing viscosity. The prepolymers containing alkoxysilyl groups, which are subject to virtually no limits in terms of their structural diversity, open up a path to the skilled polymer chemist, through the incorporation, for example, of ester, carbonate and aromatic structural elements, to a design freedom already which addresses virtually any performance needs.

The curable material and prepolymers obtained by the process of the invention, and also the compositions comprising them, are suitable as base materials for the production of a multiplicity of industrially applicable products.

The invention therefore further provides for the use of the urethane-group-containing curable compositions, for preparing or as, for example, adhesives, sealants, sealing compounds, binders, surface-coating materials, reactive crosslinkers, adhesion promoters, water repellents, wetting agents, primers and/or surface modifiers, architectural water repellents, additives in lacquer formulations or nail varnish formulations.

The curable materials are suitable for a very wide variety of macroscopic or microscopic substrates, selected, for example, from the following group: metals and/or metal oxides, glass and glass fibres/glass fabrics, wood, wood-based materials, natural fibres, and also, for example, cork and/or, generally, silicatic materials, concrete, mortar, plaster, masonry, and/or particles, oxidic particles, fumed silica, precipitated silicas, quartz particles and other inorganic oxide particles, glass particles, titanium dioxide, aluminium oxide, zirconium dioxide, cerium dioxide, iron oxides, copper oxides, kaolin, wollastonite, talc, mica, feldspars, hydroxides, aluminium trihydroxide, magnesium dihydroxide, boehmite, hydrotalcite and hydroxydic iron pigments, FeO(OH), carbonates, calcium carbonate and/or dolomite, iron, copper, zinc, nickel, aluminium, magnesium, metal alloys and/or carbon-containing materials, graphite and/or carbon black, organic particulate substrates, silicone resins, organically modified silicones, organic polymers and/or biopolymers, leather, tissue, paper and/or mixtures thereof.

Thus the targeted installation of the alkoxysilyl moities which anchor themselves via hydrolytic processes to masonry, concrete, mortar, etc. proves to be extremely advantageous when systems equipped in this way are employed in the area of the construction industry, in applications involving the joining and insulating sealing of, for example frames for windows and doors in construction shells.

The curable materials of the invention and also the compositions comprising them can be used in the form of solutions or else emulsions or suspensions or foams. The solvent or suspension/emulsion medium may be selected according to the application. As well as water, suitability is possessed by aromatic and nonaromatic solvents, including alcohols, hydrocarbons, etc.

In the context of increasing environmental awareness, however, the addition of organic solvents for the purpose of reducing the viscosity of surface-modifying formulations has in recent years come increasingly under fire. An alternative option is to apply the urethane-group-containing silyl polyethers in the form of an aqueous emulsion.

A further use of the urethanized curable materials bearing alkoxysilyl groups is as aqueous emulsions, prepared by the process disclosed in the as yet unpublished specification DE 10 2009 022630.3. In spite of the supposed and structurally determined sensitivity of the reactive prepolymers to hydrolysis, it has now been found, surprisingly, that they can be converted into stable emulsions. An emulsion is termed stable when the emulsion, preferably after one month of storage at room temperature, but at least after one week of storage at room temperature, shows no signs visible to the eye of breaking. The breaking of an emulsion is defined here as its separation into a macroscopic oil phase and water phase. An emulsion is termed stable to hydrolysis if after one month of storage at room temperature, but at least after one week of storage at room temperature, the free alcohol content of the emulsion corresponds to the splitting of not more than 10% by weight of the emulsified alkoxysilyl groups.

The optimum mass fraction of water and of polymer is dependent on the application. It is left to the skilled person to find the optimum mass fraction of the reactive polymer for a particular area of application. The skilled person, however, is familiar with the fact that the preferred fraction of water in such emulsions lies between 10% by weight to 97% by weight, more preferably between 20% by weight and 90% by weight, and more particularly greater than 30% by weight.

Suitable emulsifiers for such emulsions include in principle all anionic, nonionic, cationic and amphoteric emulsifiers and also emulsifier mixtures. Preferred examples of such emulsifiers are alcohol ethoxylates, fatty acid ethoxylates, ethoxylated esters, and (ethoxylated) sorbitan esters.

The aqueous phase of the emulsions may comprise hydrophilic, inorganic fillers for modifying the mechanical properties of the coatings of the invention, with the proviso that these hydrophilic fillers are added subsequently to the already stabilized emulsion. It can be advantageous if the surface of the fillers used has at least one functional group, so that, after drying and/or breaking of the emulsion, there are chemical reactions between reactive functional groups of the urethane-group-containing silyl polyether with those on the filler surface. Examples of such fillers are fumed and precipitated silica, inorganic oxides such as aluminium oxide, titanium dioxide and zirconium dioxide, glass and quartz, hydroxides such as aluminum hydroxide and magnesium hydroxide, silicates such as wollastonite, mica, kaolin and talc, calcium carbonate and other carbonates, metals such as copper, zinc and nickel, and metal alloys, and also graphite and carbon black.

The emulsion may further comprise low-molecular-mass, organofunctional and water-insoluble silanes, as described above. The emulsion may likewise comprise catalysts for fixing the urethane-group-containing silyl polyethers to a surface.

It is also possible for other functional substances to be added to the emulsions. Such substances include, for example, rheological additives, defoamers, deaerating agents, film-forming polymers, antimicrobial and preservative substances, antioxidants, dyes, colorants and pigments, anti-freeze agents, fungicides, adhesion promoters and/or reactive diluents, and also plasticizers and complexing agents. Additionally, spraying assistants, wetting agents, vitamins, growth substances, hormones, fragrances, light stabilizers, free-radical scavengers, UV absorbers and other stabilizers may be added to the mixtures.

The invention further provides for the use of emulsions and/or suspensions comprising the curable materials of the invention, where the emulsions and/or suspensions comprise compounds selected from the groups of catalysts, photolatent bases, additives for modifying the rheological properties, hydrophilic fillers, organofunctional and/or partially soluble and/or water-insoluble silanes and/or siloxanes, auxiliaries, film formers, antimicrobial and preservative substances, dispersants, defoamers and deaerating agents, dyes, colorants and pigments, anti-freeze agents, fungicides, adhesion promoters and/or reactive diluents, plasticizers and complexing agents, spraying assistants, wetting agents, vitamins, growth substances, hormones and/or fragrances, light stabilizers, free-radical scavengers, UV absorbers and/or stabilizers.

The invention further provides for the use of the curable materials and/or of the emulsions and/or suspensions as base materials for varnishes, inks, release agents, adhesives, cosmetic products, scratch-resistant coatings, architectural preservatives, corrosion inhibitors and/or sealants, for coating paper, particles, textile fibres and glass fibres, for coating fillers for paper, for generating antistatic surfaces and/or as starting material for the production of rubber parts on the basis of polypropylene oxide.

The curable materials of the invention can be employed as binders, in other words for the joining of materials of the same or different kinds to one another. The materials to be bonded, or to be joined to one another, may be, for example, glass, metals, plastics, wood or building materials such as concrete, linker, ceramic or stone. In the production of wood-based materials, such as chipboard, OSB or MDF boards, for example, they serve for the bonding of the wood particles or cork particles (including wood chips or wood fibres) and hence are also available for flooring, including wood-block flooring, and laminate applications as a substitute for amino resins or isocyanate bonding compositions.

The curable materials of the invention may also possess thermoplastic properties and hence may also serve for producing mouldings for which a temperature-dependent flow behaviour is required. The moulding compounds may be used in processes such as, for example, injection moulding, extrusion or hot pressing. The polymers of the invention may be used preferably without catalysts, thus preventing further crosslinking and curing during the shaping operation. Following crosslinking, the polymers carrying silyl groups and optionally NCO groups undergo conversion to form thermoset products.

The curable materials of the invention find application likewise in the polyurethanes sector. Depending on whether they have terminal hydroxyl groups or isocyanate groups, they may take on the function of the polyol component and/or isocyanate component in polyurethane systems that are known to the skilled person. In systems of this kind, the prepolymers equipped with moisture-crosslinking alkoxysilyl groups are used preferably in a mixture with other conventional polyols and/or isocyanate compounds. The use of alkoxysilyl-bearing components of this kind in PU systems permits the reactive attachment of the polyurethanes and polyurethane foams produced to a variety of substrate surfaces.

The invention therefore provides curable materials produced by reacting at least one silyl polyether 1 with at least one isocyanate compound as a constituent of compositions which can be used as adhesives, bonding materials and/or coating materials, including as a component in polyurethane systems.

The surfaces to be coated can be coated by known methods such as spraying, spreading, dipping, etc. The surfaces to be bonded are preferably pressed together in the course of the process. The application of the optionally foamable mixture (compositions) in order to produce the adhesive bond takes place preferably from a pressurized can, with foam formation taking place by means of the blowing agent which is present in the mixture and may also be released by chemical reaction.

When the surfaces to be bonded are pressed together, the structure of the foam is preferably at least largely destroyed. Accordingly, the foam, when it has been pressed between surfaces to be bonded, has a gas bubble content of preferably less than 60% of its volume, more preferably less than 40% of its volume, and with particular preference less than 20% of its volume.

In one preferred embodiment, at least one of the surfaces to be joined is moistened before the inventive application of the foam. With very particular preference, one of the surfaces to be joined is moistened, while the foam is applied to the other surface. The foam is then pressed between the two surfaces.

The high initial strength of this foam can be attributed to a phenomenon which is surprising even to the skilled person. Hence, in contrast to what is the case with conventional silane-crosslinking adhesives, the bond strength of the foam is developed not only as a result of the chemical silane crosslinking. Instead, alongside this chemical curing process, there is also a remarkable physical effect apparent, as known otherwise only in contact adhesives, where the development of strength takes place only through the evaporation of added solvents. In the case of the foam, the function of these solvents is taken over by the blowing agent or blowing agent mixture. In contrast to what is the case with the contact adhesives, which cure only very slowly, the blowing agents, instead of unhurried evaporation, evaporate in large part suddenly even while the foamable mixture is being foamed. They foam up to form the foam, which, in spite of the very high viscosity following evaporation of the blowing agent, remains—surprisingly—highly mobile, so that the foam can be collapsed without problems by the pressing-together of the surfaces to be bonded. When the foam is compressed, a thin, uniform layer of adhesive is formed between the surfaces to be bonded, and the surfaces are well wetted, thus allowing an optimum bonding effect to be achieved. This effect is subsequently reinforced by the chemical curing reactions that take place.

The invention accordingly further provides a method of adhesively bonding surfaces, wherein a foamable curable material is provided which is foamed between the surfaces to be bonded to form a foam, or else the foam which is preparable from the mixture is applied, after foaming, to one of the surfaces to be bonded, or between the surfaces to be bonded, and the foam is subsequently compressed between the surfaces to be bonded.

The invention further provides a method of joining surfaces, in which the curable material is applied to at least one of the surfaces to be joined or between the surfaces to be joined, which are then bonded with curing.

The invention additionally provides an analogous method for the sealing or bridging or filling of surfaces, cracks or gaps, in which a curable material is applied between the surfaces to be sealed, which are subsequently cured, with assurance of the imperviousness.

In both analogous methods, the curable material may be applied in the form of a foam.

Where these compositions of the invention are to be foamable, they comprise one or more blowing agents which optionally are formed chemically and/or physically.

The invention therefore further provides for the curable materials which comprise one or more blowing agents, which may be formed chemically and/or physically, and the foams produced therewith.

The invention additionally provides a method of joining surfaces by applying the curable material in the form of a foam.

The high initial bond strength of the foam is promoted by a very high foam density. Hence it is possible to prepare foamable compositions which comprise
(A) the urethanized, silyl-group-bearing prepolymers and
(B) less than 15% by weight of blowing agent, based on the total mixture.

The mixture preferably contains less than 15% by weight of blowing agent, based on the total mixture.

Suitable blowing agents are gases which are condensable even at relatively low pressures and which can also be used for producing sprayable assembly foams. Examples of common blowing agents include hydrocarbons having in each case 1 to 5, more particularly 3 to 5, carbon atoms, especially propane/butane mixtures or isobutane, hydrofluorocarbons having 1-5 carbon atoms, e.g. 1,1,1,2-tetrafluoroethane or 1,1-difluoroethane, or dimethyl ether, and also corresponding mixtures. The blowing agent content is preferably <10% by weight, more preferably <7% or <5% by weight, based on the total mixture.

The blowing agent content, based on the total mixture, is preferably not more than 10% by weight, more preferably not more than 7% by weight.

Foaming may also take place without addition of a blowing agent, on a purely chemical basis, then preferably, however, in the case of hot curing or warm curing. In such cases, when the adhesive mixture is heated, a low-volatility blowing agent is formed which comprises, for example, alcohols such as methanol or ethanol originating from the hydrolysis of the alkoxysilyl group. Water or an inert solvent may also serve at elevated temperature as blowing agents.

Where the coating of a substrate is desired, it is also possible to leave out the blowing agent, and to set the physical properties required for coatings in a particular way, where appropriate by addition of solvents or other additives and auxiliaries.

The reactive urethanized and silane-functional curable materials are also outstanding suitable for the modification of sheetlike and/or particle surfaces.

Modification here refers to the chemical or physical attachment of a modifier to the solid surface in question. This modification, based on the solid surface, may optionally be partial or complete, it being possible for the surface of the solid to be covered with an impervious monolayer or else with a multilayer. Modification in the sense of this definition also includes surface coatings which in general cover the full area, as in the case, for example, of paints, inks and/or hydrophobisizing agents.

Modifications of areas or particles for the purpose of modifying surfaces are carried out for a wide diversity of reasons and by a wide variety of methods, and are known to the skilled person from the literature. Generally speaking, the purpose of modifications is to achieve a purposive adaptation of the chemical and physical properties of surfaces of a carrier material to the particular desired application, through the application to said surfaces of a layer—usually a thin layer—of a modifier. For example, modifiers fulfil important functions as adhesion promoters, primers, varnishes, water repellants or wetting agents. Common to all variants of the coatings is the application of a layer which adheres very well to the substrate in question, through application of an often liquid or pulverulent, easy-to-apply modifier. This by no means ensures the purposive incorporation of silyl anchor groups at those sites on the polymer that require their positive effect.

Depending on the nature of the surface to be modified, the chemicophysical nature of the modifier in question, and the performance objective of the desired surface modification, very different methods are employed for applying the layers. In addition, for example, to thermal and electrochemical methods, chemical modification methods in particular have a prominent role to play.

The effective adhesion to a wide variety of substrates is based on the high density of silane anchor groups, supported where appropriate by additional reactions of NCO functions of the prepolymer with reactive groups on the substrate surface, in combination with strong physical interactions of the urethane groups with polar chemical groups such as OH groups on the surface of the respective substrate. The absence of further silyl groups in the structures of DE 10 2004 018548 within the base polymer chain, in the form of side groups, for example, limits the crosslinking density and also the adhesion after curing.

Crosslinking thereof to form solid end products, or chemical/physical attachment thereof to reactive surfaces, as to particle surfaces, for example, is accomplished in a simple way, optionally with the addition of water, acid or base or metal compounds as accelerants, the cure time being controllable through an increase in temperature during the curing operation. The surfaces may by formed microscopically, in the form for example of particles or particle agglomerates, and/or macroscopically, in the form of sheetlike structures or fibres or similar three-dimensional bodies.

Particle surfaces of solid or else porous particles may be surface-coated in accordance with the invention by methods known from the prior art. These include the spraying of the urethanized silyl polyethers onto the particles with mixing, kneading and/or heating, optionally in the presence of suitable crosslinking catalysts. The modifiers of the invention, purely or from suitable organic and/or inorganic solvents, may also be applied to the particle surfaces, where they are then able to react with covalent attachment. A further possibility is to apply emulsions comprising the modifiers of the invention in suitable media, where appropriate with addition of auxiliaries, further modifiers and emulsifiers and/or wetting agents, to the particle surfaces. Also possible is the modification of particle surfaces in a matrix of (pre-)dispersed particles, as for example of functional particles or particulate fillers (pre-)dispersed in a polymer or a paint, through addition of the modifiers to the corresponding systems, with thorough mixing, where appropriate with heating and/or the addition of a suitable catalyst. In each case, the urethane-groupcontaining silyl polyethers may be admixed with other components, such as, for example, monomeric, oligomeric or polymeric silanes, or other components bearing reactive groups, and also materials which attach or cure by a different mechanism, such as, for example, acrylates, epoxides, isocyanates, carboxylates, hydroxides, lactones, lactams, etc. It is also possible to use mixtures with one another of two or more of the urethane-group-containing silyl polyethers.

The surfaces to be modified may be microscopic or macroscopic and may thus be composed of individual particles or aggregated particles.

The particles or substrates to be modified may be of a variety of origins, sizes and particle-size distributions, and may also have different morphologies (spherical, platelet-shaped (with different aspect ratios) and fibrous, fractally aggregated, cubic or cuboidal, etc.), and may be in different states of agglomeration; such systems include, for example, oxidic particles, such as fumed silica, examples being AEROSIL®s from EVONIK Degussa GmbH, precipitated silicas, examples being SIPERNAT®s from EVONIK Degussa GmbH, quartz particles and other inorganic oxide particles, such as glass particles, titanium dioxide, such as, for example, AEROXIDE® $TiO_2$ P25 and AEROXIDE® $TiO_2$ P90 from EVONIK Degussa GmbH, aluminium oxide, such as, for example, AEROXIDE® Alu C from EVONIK Degussa GmbH, zirconium dioxide and/or cerium dioxide, iron oxides, copper oxides, etc., silicatic particles such as, for example, particles of kaolin, wollastonite, talc, mica, feldspars, etc., hydroxides such as aluminium trihydroxide and/or magnesium dihydroxide, boehmite, hydrotalcite, silicatic materials in general, concrete, mortar, gypsum, masonry, oxidic particles, hydroxidic iron pigments, such as FeO(OH), carbonates, such as calcium carbonate and/or dolomite, metals such as iron, copper, zinc, nickel, aluminium, magnesium, etc., metal alloys and/or carbon-containing materials, such as graphite and/or carbon black, for example, etc.

As organic particulate substrates it is possible to use particles comprising, for example, silicone resins, organically modified silicones, organic polymers and/or biopolymers, etc.

The different particles may also be surface-modified in a mixture.

The ratio of particle material to curable material is dependent on the available particle surface area, the desired degree of modification and the molecular weight of the modifying agent. Based on the mass of the particles to be modified, the modifying agent or the curable material of the invention may be situated in terms of mass ratio of particle material:curable material in the range from 1:10 to 1 000 000:1, preferably from 1:1 to 10 000:1 and more preferably in the range from 2:1 to 1000:1.

If the particle weight is viewed in relation to the total mixture used for surface modification, composed of compositions comprising the curable material or materials or modifier or modifiers of the invention, optionally catalyst, solvents, further silane compounds, and also other auxiliaries, then the mass ratio of particle weight:modifying mixture may be situated in the range from 1:1000 to 100 000:1, preferably in the range from 1:100 to 1000:1, more preferably in the range of 2:1 to 1000:1.

Macroscopic surfaces may also be coated with the urethane-group-containing silyl polyethers by the methods known from the prior art. In such cases the modifiers, either in pure form or else as a blend with further components, examples being inorganic and/or organic solvents, reactive components such as monomeric, oligomeric or polymeric silanes, acrylates, epoxides, hydroxy compounds, amines, etc., and also further coating components or auxiliaries, may be used for the surface modification.

The application of the urethane-group-containing silyl polyethers may in this case take place in pure form purely, in organic or inorganic solvents, as aqueous emulsions, as mixtures of the urethane-group-containing silyl polyethers with other compounds bearing silyl groups, in combination with differently functionalized modifiers, such as isocyanates, hydroxyl compounds, epoxides, acrylates and amines, for example.

The modification of macroscopic surfaces with the materials described may be carried out, for example, by the methods known from the prior art, such as dip, spray or spin coating, flow coating, misting, brush application, rolling, printing, screen printing, stamping and—given a suitable consistency of the formulas of the invention that are used for surface modification—by powder coating methods as well. Moreover, it is also possible to use emulsions comprising the urethane-group-containing silyl polyethers in suitable organic and/or inorganic solvents, where appropriate with addition of further substances such as, for example, coating components, auxiliaries, such as, for example, wetting agents, emulsifiers and/or rheological additives, and also fillers and/or functional particles, for modifying the surfaces.

Examples of such surfaces are macroscopic and microscopic surfaces such as surfaces of glass, paints, metals, semiconductor materials, oxidic materials such as stone, concrete or mortar, wood, organic and inorganic fibres, woven fabrics and particles, polymers, biopolymers, cork, leather, paper, tissue, etc.

The application possibilities for thus-modified surfaces or particle surfaces are diverse. Thus, for example, particles treated in this way may be used as fillers for polymers or for preparing polymer compounds, nanocomposites and master batches. The use of the urethane-group-bearing silyl polyethers of the invention may take the form wherein the particles to be modified are modified in a preliminary operation and then dispersed in the polymer, though it is also possible to add the urethane-group-bearing silyl polyethers in the course of the dispersing of the fillers in the polymer in question, by way, for example, of a liquid feed in an extruder, with an effective dispersing section thereafter. Surprisingly, the modification of particle surfaces with the urethane-group-bearing silyl polyethers is generally accomplished without caking or aggregation of the particulate materials to be modified, in spite of the polyfunctional nature of the prepolymers.

Furthermore, particles surface-modified in accordance with the invention may be used, for example, as constituents of reactive diluents, emulsions, wetting agents, paints, adhesion promoters, binders, plasticizers, thixotropic agents, fungicides, flame retardants, pigments, fillers, functional additives in plastics, polymeric foams, organic resins or silicone resins, where appropriate with reactive attachment to the matrices in question, melt flow index improvers in injection moulding applications, textile or fibre slip additives, lubricants, matting agents, adsorbents or absorbents, self-dispersible particles, particulate emulsifiers, defoamers, binders for ceramic masses, architectural preservatives, encapsulants, sealing systems, antistatic additives, free-flow aids, microbicidal additives, fluorescent markers, effect pigments, matting agents, release agents, low-temperature-resistant cable coatings, conductive coatings, conductor tracks, antistatic coatings, electronic and/or electrical components, rubber parts and membranes, sizes in the textile and glass fibre industries, paper, additives for toners, abrasives or line fillers in cosmetics, formulating agents or carrier materials, colorants and preservatives, coatings, corrosion inhibitors, inks and/or varnishes, tribological and/or haptic coatings for obtaining physical effects on surfaces, such as superhydrophobicity, temperature-dependent wettability, beading effects, influencing the dirt pick-up behaviour and the soil release behaviour on solid surfaces on constructions, textiles of fibres, and also the adhesion of condensates and ice to surfaces and particles coated in accordance with the invention, and as slip additives or lubricants, in sealing systems, for obtaining haptic effects, such as, for example, a silky hand (soft-touch surfaces) or a particular surface roughness or grip, as matting agents, as points of attachment for other materials, such as other coating materials, for example, as adsorbents or absorbents in, for example, paper materials or filter materials or fabrics, as self-dispersible particles for producing dispersions, as particulate emulsifiers (for what are called "Pickering emulsions"; see also "Emulsions", Spencer Umfreville Pickering, Journal of the Chemical Society, Transactions (1907), 91, 2001-2021), as reactive and/or crosslinkable particles, where appropriate in dispersion in liquid media, as active components in defoamers, in architectural preservatives, for example as active components for integral hydrophobisization of materials, as a structured hydrophobic component for surface hydrophobisization or as a carrier for active liquid components, as (optionally reactive) encapsulants, such as, for example, for core-shell particles or for the microencapsulation of liquid systems, for the modification of membrane materials, as for example for obtaining a defined, adjustable porosity, selectivity or permeability, as antistatic additives, for example after hydrophilic or hygroscopic particle surface modification, as free-flow aids, as additives for obtaining or enhancing scratch resistance on the part of the surfaces or materials furnished with the particles, or as particulate additives with other functions, for example as microbicidal additives, as fluorescent labels or as effect pigments, as release agents, as constituents for low-temperature-resistant cable coatings, as manufacturing components of rubber parts and membranes, as a size or ingredients for sizes in the textile and glass fibre industries, for paper, as additives for toners, as abrasives or line fillers in cosmetics, as carrier materials or formulating ingredients which release auxiliaries or active substances over a prolonged period of time, the substances which may be present in the particles and which are to be released being, for example, cosmetic oils and active ingredients, fragrances, active pharmaceutical ingredients, active antimicrobial ingredients, including, for example, silver and compounds containing silver, and also dyes and preservatives, etc.

The inventive formulations when used as a constituent of a formulation described above serve to improve properties such as providing good adhesion on different substrates, good processability because of relative low viscosity, high reactivity in connection with curing, adjustable mechanical properties because of chemical modifications as e.g. elongation, e-module, shore hardness, etc.

The invention accordingly further provides the materials, fabrics and substances mentioned above that are coated and are produced using the curable materials bearing urethane groups.

The reactive curable materials may be used for surface modification or as a coating, as bulk material and also—by suspension polymerization, for example—for preparing particulate materials. Their crosslinking to give solid thermoset end products and fixing to substrates having rective groups, more particularly hydroxyl groups, are accomplished in a simple way in the presence of water and, optionally, with addition of acid or base or other accelerants, it being possible to control the rate of cure by increasing the temperature during the curing procedure.

This permits the modification of a wide variety of surfaces, consisting, for example, of metal oxides, mixed oxides, nitrides, hydroxides, carbides, carbonates, silicates, pigments, carbon blacks, elements or alloys, and also surfaces of organic materials. In addition, of course, the surfaces of organic particles, such as those of silicone resins, organically modified silicones, organic polymers or biopolymers, are also amenable to surface modification.

Hence the curable materials may serve, for example, as base materials for the preparation of adhesives, as reactive crosslinkers, as adhesion promoters and primers, and also binders for metals, glass and glass fibres/glass fabrics, wood, wood-base materials, natural fibres, for the finishing and treatment of textile or non-textile sheetlike structures and fibres made from natural and/or synthetic and also mineral raw materials, and also, for example, cork, leather, paper, tissue, silicatic and oxidic materials.

The deliberate incorporation of alkoxysilyl moieties which are anchored via hydrolytic processes to masonry, concrete, mortar, etc. proves to be extremely advantageous when systems equipped in this way are employed in the area of the construction industry, in applications involving the joining and insulating sealing of, for example, frames for windows and doors in construction shells.

The invention further provides for the hydrophobisization of buildings, using the curable materials as a constituent of water repellents, and the surface hydrophobicity which can be ensured and tailored as a result in accordance with the intended application, and which first prevents the surface being wet through but second allows water vapour to pass.

Particularly in the case of urethane-group-containing silyl polyethers having a hydrophobic radical or else a high PO, BO or SO content (propylene oxide, butylene oxide and/or styrene oxide content), high hydrophobisization rates can be achieved. Polyethers containing SO, in particular, are highly suitable, for example, for modifying carbon materials, such as graphite and/or carbon black, for example, in order that the latter are, for example, more readily dispersible.

The furnishing or treatment of the sheetlike structures serves on the one hand to protect the surface or fibre, to improve its properties and/or alter its properties, or to attain new profiles of properties.

Thus, for example, graphite and also hexagonal boron nitride can be incorporated into a silyl polyether containing urethane groups, in order to produce what are called low-friction coatings. These low-friction coatings have "smoothness" as a haptic effect, in contrast, for example, to coatings filled with AEROSIL® 200, which appear very "grippy".

The invention further provides the tribological and/or haptic coatings produced in this way, comprising graphite or boron nitride.

The invention additionally provides sealants and/or adhesives comprising the curable materials of the invention, where even a surface coating is already itself capable of providing sealing or adhesive bonding. These sealants and/or adhesives may comprise, in particular, lubricant additives and also, for example, $MoS_2$ or PTFE particles.

Furthermore, the curable materials may also find use in the production of electrical and/or electronic components such as, for example, OLEDs and solar panels. As additives in this case there may be conductive particles or ionic liquids present, hence allowing use in conductive coatings and conductive adhesives, in conductor tracks, for example, for contacting and/or for antistatic coating.

The curable materials may be utilized alone or as additives in aqueous systems for the treatment of the stated sheetlike structures and fibres, and thus allow the use of the sheetlike structures and fibres thus treated in the hygiene, medical, construction, automotive, home furnishing, textile apparel, sport and agricultural sectors.

The particles or sheetlike structures thus surface-modified therefore have new properties or optimized properties such as in respect, for example, of softness, lubricity, water transport/absorption, water/oil repellency, UV protection, self-cleaning (Lotus effect) for awnings, for example, flame retardancy, an increase in strength in tandem with excellent flexibility, antistatic properties and resistance to bacteria, viruses and chemicals.

Also provided by the invention, therefore, is a method for the surface modification of particles or sheetlike structures, in which the curable materials are applied, with mixing and/or in the presence of suitable crosslinking catalysts, in pure form or from suitable organic and/or inorganic solvents, to the particle surfaces, or from emulsions, where they are then able to react with covalent or physical attachment.

As surfaces to be modified it is preferred to use organic and/or inorganic particles or sheetlike structures and/or organically modified particles or sheetlike structures and/or mixtures thereof with one another.

The invention further provides for the use of the curable materials in cosmetic applications, as additives in varnish or nail-varnish formulations.

With the curable materials it is also possible, furthermore, to bring about specifically physical effects on solid substrates, such as hydrophobic or hydrophilic surface properties, for example. In this context it is also possible, furthermore, for effects of this kind to be subject to an additional stimulus, such as that of the prevailing temperature, for example. As is known from the literature, polyethers in water have what are called cloud points, as a function of temperature, which result from the development with increasing temperature of incompatibility with the surrounding medium. It has been shown that it is possible, via the attachment of silyl polyethers containing urethane groups to different surfaces, to make their contact angles with respect to various liquids, water for example, a function of temperature.

The invention further provides the production of flame-retardant thermoplastic polymer compounds or thermoset moulding compounds comprising the curable materials of the invention and able additionally to comprise flame-preventing and/or flame retardant substances such as, for example, ATH (aluminium trihydrate=aluminium hydroxide aluminium trihydroxide) or MDH (magnesium dihydroxide). Polymer compounds of this kind are employed, for example, for producing cable insulation materials based on polypropylene, polyethylene or ethylvinyl acetate for cables and cable jackets, or flame-preventing partitions are produced on the basis of polypropylene, for example, which in public buildings such as sports halls, for example, are subject to particularly stringent requirements.

The flame retardant compositions, compounds or electrical cables thus treated may have an improved mechanical stability, improved dispersing of further additives, good extrusion properties, even in the case of a high level of filling with particulate additives (as for example with talc, calcium carbonate, etc.) and also improved flame prevention, or reduced smoke evolution, under strong heating. Particularly when silyl polyethers are used that contain siloxane groups, the silicon content may provide additional stability in the event of fire, since, after combustion, an additionally stabilizing and fire-retardant $SiO_2$ component is left. Furthermore, even during combustion, the phenomenon known as skinning is forced to occur at an earlier point in time, and reduces the further increase in the temperature of the material, hence inhibiting the progress of the fire, a factor which is particularly relevant in the case, for example, of cables which lead from one room into the next room.

Additionally provided by the invention are composites such as, for example, wood-plastic composites (WPCs) produced using the curable materials. WPCs are thermoplastically processable composites which are composed of different proportions of wood, plastics and additives and are processed by thermoplastic shaping techniques, such as, for example, extrusion, injection or compression moulding techniques. As compared with polypropylene-maleic anhydride-grafted copolymers, the innovative silyl polyether composites exhibit enhanced attachment to the wood or fibre substructure of these composites. The curable materials bind to the fibres based on wood, coconut or other naturally available fibre products and at the same time render this surface water repellent, thereby guaranteeing a reduced drying time of the wood fibre pellets (energy saving).

The invention further provides powder coating curing agents.

The invention further provides liquid pastes in which the curable materials are used alone instead, for example, of a customary polyether polyol (PPG 1000), which generally necessitates the additional use of a dispersant, since the urethanized silyl polyether combines the properties of both materials. Pastes of this kind which may comprise pigments as colorants or may further comprise dyes and other additives are used for the colouring of polyol-based systems such as, for example, PU foams, thermoplastic urethanes or the like.

The curable materials of the invention can be employed, furthermore, as binders for binding ceramic particles for producing ceramic products, especially refractory ceramic products, from ceramic powder. The invention further provides for the use of the binder, and a process for producing aforementioned ceramic products, and also ceramic products as such, with refractory ceramic products being particularly preferred in accordance with the invention.

Refractory ceramic products are used for protection against high temperatures in numerous industrial plants.

Preference is given to using binders of low to medium viscosity, <10 000 mPas, which initially allow complete, uniform envelopment of all ceramic particles in the preparation phase, as a basis for subsequent attainment of high crosslinking densities and hence mechanical strengths even in green body production, and at temperatures which are already higher in brown body production or even white body production.

Entirely surprisingly, it has been observed that, when the reactive curable material of the invention is used as a ceramic binder in the temperature range between, for example, 100° C. and 1000° C., preferably 200° C. and 800° C., there is no decrease or at most only a slight decrease in the material strength (in comparison with the green body treated at lower temperatures), i.e. cold compressive strength [MPa].

For the purposes of this invention, ceramic products include dried, heat-treated and/or fired ceramic products. The term "ceramic product" also encompasses green bodies. In particular, the term "ceramic product" encompasses heat-resistant and/or refractory ceramic products, and also shaped bodies and materials which constitute what is called a composite, i.e., are made up of a ceramic material and at least one other material and/or other phase.

The reactive ceramic binder of the invention, comprising the curable material, may be added to the ceramic powder, based on the total weight of the ceramic powder, with a weight fraction of 0.01% to 70% by weight, preferably of 0.1% to 50% by weight and more preferably of 0.5% to 30% by weight, and with particular preference 0.5% to 5% by weight.

Preferred in accordance with the invention are amounts of these curable materials in the range from 0.05 to <10% by weight, more particularly 0.1% to 5% by weight, based in each case on the amount of ceramic powder. If the amount of the curable material added is below 0.01% by weight, it is very difficult to obtain a fired product of high strength.

In accordance with the invention, the reactive curable material can be used for producing ceramic products, especially shaped and unshaped, fired and unfired refractory ceramic products, from ceramic powder(s).

The present invention therefore further provides ceramic curable materials containing inventive ceramic binder and ceramic powder(s). The ceramic materials may be used directly or first processed to powders or granules. The invention also provides for the use of the urethanized curable materials of the invention as reactive diluents, emulsions, wetting agents, varnishes, adhesion promoters, plasticizers, thixotropic agents, fungicides, flame retardants, pigments, fillers, polymeric foams, organic resins or silicone resins, melt flow index improvers, in architectural preservation, for modifying textiles or fibres, as slip additives, lubricants, matting agents, adsorbents or absorbents, self-dispersible particles, particulate emulsifiers, defoamers, architectural preservatives, encapsulants, in sealing systems, as antistatic additives, free-flow aids, microbicidal additives, fluorescent markers, effect pigments, release agents, low-temperature-resistant cable coatings, conductive coatings, conductor tracks, antistatic coatings, electronic and/or electrical components, rubber parts and membranes, sizes in the textile and glass fibre industries, paper additives, additives for toners, abrasives or line fillers in cosmetics, formulating agents or carrier materials, dyes and preservatives, coatings, corrosion inhibitors, paints, tribological and/or haptic coatings Suitable ceramic particles may include all typical, oxidic, non-oxidic, acidic or basic ceramic raw materials and also mixtures thereof. Particular preference is given to ceramic products based on $Al_2O_3$. Mixtures of these raw materials may also be present.

Ceramic powders which can be used with particular suitability, especially mixtures of ceramic powders, and also their raw materials, include the following:
oxides, such as BeO, MgO, $Al_2O_3$, $SiO_2$, CaO, $TiO_2$, $Cr_2O_3$, MnO, $Fe_2O_3$, ZnO, $ZrO_2$, SrO, $Y_2O_3$, BaO, $CeO_2$, $UO_2$; and/or carbides, such $B_4C$, $Be_2C$, $Be_4C$, $Al_4C_3$, SiC, TiC, $Cr_3C_2$, $Mn_3C$, $Fe_3C$, $SrC_2$, $YC_2$, ZrC, NbC, $Mo_2C$, $BaC_2$, $CeC_2$, HfC, TaC, WC, UC, carbon in the form, for example, of graphite, carbon black or graphitisized carbon material; and/or
nitrides, such as $Be_3N_2$, BN, $Mg_3N_2$, AlN, $Si_3N_4$, $Ca_3N_2$, TiN, VN, CrN, $Mn_3N_2$, $Sr_3N_2$, ZrN, NbN, $Mo_3N_2$, HfN, TaN, $WN_2$, UN; and/or borides, such as $AlB_4$, $CaB_6$, $TiB_2$, $VB_2$, $CrB_2$, MnB, FeB, CoB, NiB, $SrB_6$, $YB_6$, $ZrB_2$, $NbB_2$, $MoB_2$, $BaB_6$, $LaB_6$, $CoB_6$, $HfB_2$, $TaB_2$, WB, $TUB_4$; and/or silicides, such as CaSi, $Ti_5Si_3$, $V_5Si_3$, $CrSi_2$, FeSi, CoSi, $ZrSi_2$, $NbSi_2$, $MoSi_2$, $TaSi_2$, $WSi_2$; and/or mixtures of the aforementioned ceramic substances.

Further ceramic particles which may be used include oxidic and non-oxidic compounds, mixed phases, etc., for example, mullite ($Al_6Si_2O_{13}$), mixed crystals comprising the system $Al_2O_3$—$Cr_2O_3$, $MgSiO_4$, $CaSiO_4$, $ZrSiO_4$, $MgAl_2O_4$, $CaZrO_3$, SIALON, ALON, and/or $B_4C$-$TiB_2$.

It is additionally possible to use ceramic particles having a non-stochiometric composition, such as TiOx silicates, glasses and ceramic materials having a metal phase, in accordance with the invention.

Ceramic particles which can be used in accordance with the invention may also comprise calcined aluminas, reactive aluminas, very finely milled, refractory raw materials, such as microsilica, refractory clay and/or binder clay.

Urethanized prepolymers with a high styrene oxide content as well may exhibit particularly advantageous properties in the context of processing to form moulding compounds. In particular it is possible to disperse carbon materials, such as carbon blacks or graphites, for example, effectively in the silyl polyethers 1 of high styrene oxide content, leading to advantageous results/properties with regard to the moulding compounds.

The ceramic masses may further comprise catalysts, customary adjuvants, binders and/or additives. The ceramic masses may in particular also include small amounts of mould release agents, stabilizers and/or pigments.

Furthermore, the use of ceramic masses comprising ceramic binders in combination with hydraulic binders, such as high-alumina cement, portland cement, optionally with water in variable amounts, may likewise be advantageous.

Based on the total weight of the ceramic powder, the reactive ceramic binder of the invention may be present in the moulding compound or ceramic mass with a weight fraction of 0.01% to 70% by weight, preferably of 0.1% to 50% by weight and more preferably of 0.5% to 30% by weight.

The reaction responsible for binding, namely the reaction between ceramic powder and the alkoxysilyl-group-bearing, urethane-group-bearing prepolymer of the reactive ceramic binder of the invention, may possibly take place even at room temperature. As the temperature increases, bonding becomes stronger. Even after a thermal treatment in the intermediate temperature range from 400° C. to 1000° C., or in some cases even from 200° C. to 600° C., the ceramic products are able to attain high strengths, thereby removing the need for high-temperature firing at >1000° C.

Surprisingly it has now been found that, when using the ceramic binders of the invention, comprising urethane-group-containing alkoxysilyl prepolymers it is possible
in a relatively shorter time at the same firing temperatures; and/or
at relatively low firing temperatures in comparable times to achieve firing of fracture-free ceramic products having excellent physical and mechanical properties.

The degree of curing is dependent on the shape of the ceramic product. In any case, the shaped ceramic body is cured until it has the strength necessary to avoid a change in shape during the firing process.

Additional subject matter of the invention is described by the claims, whose disclosure content in full is part of this description.

The processes and uses of the curable materials, according to the invention, are described by way of example below, but the invention cannot be regarded as being confined to these exemplary embodiments.

Where ranges, general formulae or classes of compound are specified below, they are intended to encompass not only the corresponding ranges or groups of compounds that are explicitly mentioned, but also all sub-ranges and sub-groups of compounds which may be obtained by taking out individual values (ranges) or compounds.

The invention is further described by the following non-limiting examples which further illustrate the invention, and are not intended, nor should they be interpreted to, limit the scope of the invention.

BRIEF DESCRIPTION OF THE DRAWINGS

FIG. 1 is a larger depiction of the silyl polyether 1 of the formula (2).

WORKING EXAMPLES

The examples below were carried out using the following curable materials, comprising silyl polyethers 1 containing trialkoxysilyl groups, prepared in accordance with specification DE 10 2008 000360.3, not yet laid open, in accordance with the process principle of the DMC-catalyzed alkoxylation of 3-glycidyloxypropyltriethoxysilane (Dynasylan® GLYEO) from Evonik Degussa GmbH. PO denotes propylene oxide.

GPC measurements for determining the polydispersity and average molar masses were carried out under the following conditions: column combination SDV 1000/10 000 Å (length 65 cm), temperature 30° C., THF as mobile phase, flow rate 1 ml/min, sample concentration 10 g/l, RI detector, evaluation against polypropylene glycol standard.

The viscosities were measured in a method based on DIN 53019, using a Brookfield rotational viscometer (model LVT) at 25° C.

The NCO content in percent was determined by back-titration with 0.1 molar hydrochloric acid following reaction with butylamine in accordance with DIN EN ISO 11909.

Trialkoxysilyl Polyether SP-1:
Virtually colourless, high-viscosity silyl polyether with four-fold trialkoxysilane functionality
Chemical Construction According to Monomer Addition:
Polypropylene glycol monobutyl ether (400 g/mol)+2 mol PO+(21 mol PO/4 mol GLYEO random)+2 mol PO
Average molar mass $M_w$ 2760 g/mol, polydispersity $M_w/M_n$ 1.38, viscosity (25° C.) 365 mPa*s.

Trialkoxysilyl Polyether SP-2:
Virtually colourless, high-viscosity silyl polyether with four-fold trialkoxysilane functionality
Chemical Construction According to Monomer Addition:
Polypropylene glycol (2000 g/mol)+17 mol PO+(103 mol PO/4 mol GLYEO random)
Average molar mass $M_w$ 10 900 g/mol, polydispersity $M_w/M_n$ 2.16, viscosity (25° C.) 5050 mPa*s.

Curable Material Comprising the Urethanized Silyl Polyether USP-1:
Preparation, of an NCO- and Urethane-Group-Containing Silyl Polyether 150.2 g (49 mmol, corresponding to 49 mmol of OH functions) of silyl polyether SP-1 were charged to a 250 ml three-neck flask with reflux condenser, thermometer and KPG stirrer. Then 10.8 g of isophorone diisocyanate IPDI (49 mmol, corresponding to 98 mmol of NCO functions) were metered in slowly at room temperature, and the mixture was admixed with 0.08 g of dibutyltin dilaurate. The reaction mixture was heated to 60° C. and stirred at that temperature for an hour. This gave a clear product having a viscosity of 760 MPa*s and an NCO value of w(NCO)=1.26%.

The initial mass of isophorone diisocyanate was selected to give an excess of NCO groups over the OH groups of the silyl polyether SP-1, thus forming products which in addition to the alkoxysilyl groups also still carry free NCO groups.

Curable Material Comprising the Urethanized Silyl Polyether USP-2:
Preparation of a Urethane-Group-Containing Silyl Polyether
100 g of silyl polyether SP-1 (32 mmol, corresponding to 32 mmol of OH functions) were charged to a 250 ml three-neck flask with reflux condenser, thermometer and KPG stirrer. Then 3.6 g of isophorone diisocyanate (16 mmol, corresponding to 32 mmol of NCO functions) were metered in slowly at room temperature and the mixture was admixed with 0.05 g of dibutyltin dilaurate. The reaction mixture was heated to 60° C. and stirred at that temperature for two hours. This gave a clear product having a viscosity of 880 mPa*s and an NCO value of w(NCO)=0%.

The initial mass of isophorone diisocyanate was selected such that the OH groups of the silyl polyether were equimolar with the NCO functions, and so polyethers are linked with one another, and relatively high molecular mass polyethers are formed.

Curable Material Comprising the Urethanized Silyl Polyether USP-3:
Preparation of a Urethane-Group-Containing Silyl Polyether Having a Triethoxysilyl End Group
100 g of silyl polyether SP-1 (32 mmol, corresponding to 32 mmol of OH functions) were charged to a 250 ml three-neck flask with reflux condenser, thermometer and KPG stirrer. Then 8.0 g of 3-isocyanatopropyltriethoxysilane (32 mmol, corresponding to 32 mmol of NCO functions) were metered in slowly at room temperature. The mixture was heated to 80° C. and admixed with 0.05 g of dibutyltin dilaurate. The reaction mixture was stirred at this temperature for an hour. This gave a product which was clear at room temperature and had a viscosity of 800 mPa*s and an NCO value of w(NCO)=0%.

The initial mass of isocyanatopropyltriethoxysilane was selected such that the OH groups of the silyl polyether were equimolar with the NCO functions, and so the OH groups are consumed as completely as possible and the polyethers are modified with further triethoxysilyl groups.

Curable Material Comprising the Urethanized Silyl Polyether USP-4:
Preparation of a Urethane-Group-Containing Silyl Polyether with Desmodur® N 3300
100 g of silyl polyether SP-1 (32 mmol, corresponding to 32 mmol of OH functions) were charged to a 250 ml three-neck flask with reflux condenser, thermometer and KPG stirrer. Then 6.25 g of Desmodur® N 3300 (w(NCO)=21.8%, corresponding to 32 mmol of NCO functions) from Bayer (aliphatic polyisocyanate, HDI trimer) were metered in slowly at room temperature. The mixture was heated to 80° C. and admixed with 0.05 g of dibutyltin dilaurate. An exothermic reaction commenced, in the course of which the reaction mixture underwent heating to 105° C. The reaction mixture was subsequently stirred at 80° C. for an hour. This gave a product which was clear at room temperature and had a viscosity of 1665 mPa*s and an NCO value of w(NCO)=0%.

The initial mass of Desmodur® N 3300 was selected such that the OH groups of the silyl polyether were equimolar with the NCO functions, so that the OH groups are consumed as completely as possible, and polyethers are linked with one another, thus forming a branched silyl polyether.

Curable Material Comprising the Urethanized Silyl Polyether USP-5:
Preparation of a Urethane-Group-Containing Silyl Polyether with IPDI
100 g of silyl polyether SP-2 (10 mmol, corresponding to 20 mmol of OH functions) were charged to a 250 ml three-neck flask with reflux condenser, thermometer and KPG stirrer. Then 1.48 g of Vestanat® IPDI (6.7 mmol, corresponding to 13.4 mmol of NCO functions) from Evonik Degussa GmbH (aliphatic isocyanate) were metered in slowly at room temperature. The mixture was heated to 80° C. and admixed with 0.05 g of dibutyltin dilaurate. The reaction mixture was subsequently stirred at 80° C. for an hour. This gave a product which was clear at room temperature and had a viscosity of 21 750 mPa*s and an NCO value of w(NCO)=0%.

The initial mass of Vestanat® IPDI was selected such that the OH groups of the silyl polyether were in excess over the NCO functions, with the result that a plurality of polyethers are linked with one another, and, accordingly, a high molecular mass block polyether is constructed.

Curable Material Comprising the Urethanized Silyl Polyether USP-6:

Preparation of a Urethane- and Isocyanate-Group-Containing Silyl Polyether with IPDI 150 g of silyl polyether SP-2 (15 mmol, corresponding to 30 mmol of OH functions) were charged to a 250 ml three-neck flask with reflux condenser, thermometer and KPG stirrer. Then 6.67 g of Vestanat® IPDI (30 mmol, corresponding to 60 mmol of NCO functions) from Evonik Degussa GmbH (aliphatic isocyanate) were metered in slowly at room temperature. The mixture was heated to 60° C. and admixed with 0.08 g of dibutyltin dilaurate. The reaction mixture was subsequently stirred at 60° C. for an hour. This gave a product which was clear at room temperature and had a viscosity of 16 000 mPa*s and an NCO value of w(NCO)=0.68%.

The initial mass of Vestanat® IPDI was selected so that the OH groups of the silyl polyether were in deficit to the NCO functions, with the result that some of the NCO functions remain in excess, and, accordingly, polymers are formed which carry both NCO groups and alkoxysilyl groups.

Production of Coatings:

20 g of the urethanized silyl polyether, 0.4 g of water and 0.4 g of dibutyltin diacetylacetonate were weighed out into a beaker and mixed thoroughly using a dissolver at 1000 rpm for 20 seconds. 10 g of this curable mixture was poured at room temperature into an aluminium tray. As curing took place, hardening was tested at short intervals using the tip of a pipette. When there is no longer any sticking of the sample, a skin has formed. The following skin-forming times were measured, as a measure of the rate of cure:

| Urethanized silyl polyether: | Skin-forming time: |
|---|---|
| USP-1 | 2.5 h |
| USP-2 | 2.5 h |
| USP-3 | 1.5 h |
| USP-4 | 20 min |
| USP-5 | 2 h |
| USP-6 | 2 h |

The curing rate of urethanized silyl polyethers carrying NCO groups can be accelerated by adding amines. In a variant of the aforementioned curing experiment with USP-1, 17 g of ethylenediamine were added additionally to the curable mixture:

| Urethanized silyl polyether: | Skin-forming time: |
|---|---|
| USP-1 with ethylenediamine | 30 min |

After curing had taken place, the coatings obtained in the aluminium tray were approximately 2 mm thick.

Preparation of an Aqueous Emulsion:

12.0 g of TEGO® Alkanol S100P (stearyl alcohol, polyoxyethylene (100) ether, Evonik Goldschmidt GmbH), 3.0 g of TEGO® Alkanol TD6 (isotridecanol, polyoxyethylene (6) ether, Evonik Goldschmidt GmbH) and 15.0 g of water were heated to 60° C. in a glass vessel and stirred using a Mizer disc at 1000 rpm until a homogeneous, viscous paste was produced. With the aid of a dropping funnel, 100.0 grammes of the urethanized silyl polyether USP-1 were incorporated dropwise into the paste, with stirring, over the course of 30 minutes. When complete, the paste was stirred at 1000 rpm for 10 minutes. Thereafter the paste was diluted with the remaining 200 g of water. This gave an emulsion.

The droplet size distribution was measured by means of dynamic light scattering (Malvern HPPS with 633 nm HeNe laser). The evaluation of the correlation function using the CONTIN algorithm indicated a monomodal droplet size distribution, with an average radius of 115 nm.

Method for Use as Ceramic Binder in the Production of Refractory Materials:

A high-purity sintered α-alumina, T60 available from ALMATIS GmbH at Ludwigshafen, having the following particle distribution:

| Coarse particles | 1 to 2 mm | 50% by weight |
|---|---|---|
| Medium particles | 0.2 to 0.5 mm | 10% by weight |
| Flour | <0.1 mm | 40% by weight | was mixed homogeneously with 4 parts by weight of each of the urethanized silyl polyethers. The mixtures were used to produce cylindrical test specimens with a diameter of 36 mm, under a pressing pressure of 100 MPa, which was subsequently fired at 200° C. and 1500° C. for 2 h.

After firing had taken place, the cold compressive strength [MPa; DIN EN 993-1] of the ceramic test specimens was as follows Urethanized Silyl Polyether USP-1:
Firing temperature 200° C.: 13.5 MPa
Firing temperature 1500° C.: 96.3 MPa
Urethanized Silyl Polyether USP-4:
Firing temperature 200° C.: 14.7 MPa
Firing temperature 1500° C.: 106.1 MPa
Varnish Coating of a Glass Plate:

Using a pipette, 1.00 ml of dibutyltin diacetylacetonate was added to 50 ml of urethanized silyl polyether USP-6. The two components were homogenized using a Mizer disc at 1000 rpm. A layer of prepolymer with a thickness of 150 micrometers was applied using a bar applicator to a dry glass plate which had been cleaned with isopropanol. The urethanized prepolymer applied cures at room temperature and approximately 60% relative atmospheric humidity to form a clear film.

Having thus described in detail various embodiments of the present invention, it is to be understood that the invention defined by the above paragraphs is not to be limited to particular details set forth in the above description as many apparent variations thereof are possible without departing from the spirit or scope of the present invention.

The invention claimed is:
1. A curable material comprising:
urethane-group-containing reaction products, which is obtainable by reacting:
a) at least one compound containing one or more isocyanate groups with;

b) at least one compound bearing one or more alkoxysilyl groups and additionally bearing at least one hydroxyl group;
c) optionally in the presence of one or more catalysts;
d) optionally in the presence of further components reactive towards the reaction products; and
e) optionally in the presence of further compounds which are not reactive towards the reaction products and reactants;

wherein component (b) is one or more silyl polyethers 1 of the formula (2):

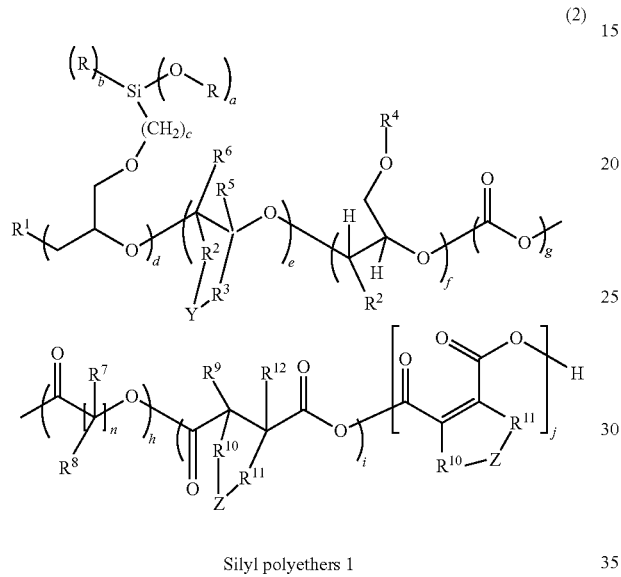

Silyl polyethers 1 where:
a is an integer from 1 to 3;
b is an integer from 0 to 2, and the sum of a and b is 3;
c is an integer from 0 to 22;
d is an integer from 2 to 500;
e is an integer from 2 to 10,000;
f is an integer from 0 to 1,000;
g is an integer from 0 to 1,000;
h, i, and j independently of one another are integers from 0 to 500;
n is an integer between 2 and 8;
R independently at each occurrence represents a radical selected from linear or branched, saturated, alkyl radicals having 1 to 20 carbon atoms or haloalkyl groups having 1 to 20 carbon atoms;
$R^1$ is a hydroxyl group or a saturated linear, branched or cyclic oxyorganic radical having 1 to 1500 carbon atoms, that is optionally further substituted, wherein the chain is optionally interrupted by a heteroatom or a radical comprising an oxyaromatic system;
$R^2$ and $R^3$ are independently of one another, H, or a saturated or singly or multiply unsaturated monovalent or polyvalent hydrocarbon radical that is optionally further substituted, wherein $R^2$ and $R^3$ are optionally bridged via the fragment Y;
$R^5$ and $R^6$ are independently of one another, H, or a saturated or singly or multiply unsaturated monovalent hydrocarbon radical that is optionally further substituted;

Y is absent, or else is a methylene bridge having one or two methylene units; if Y is absent, then at least one of $R^2$ or $R^3$ independently of one another is a linear or branched hydrocarbon radical having 1 to 20 carbon atoms;
$R^4$ independently at each occurrence is a linear or branched alkyl radical of 1 to 24 carbon atoms or an aromatic or cycloaliphatic radical, which optionally further comprises alkyl groups;
$R^7$ and $R^8$ are independently of one another either hydrogen or an alkyl, alkoxy, aryl or aralkyl group; and
$R^9$, $R^{10}$, $R^{11}$, and $R^{12}$ are independently of one another either hydrogen or an alkyl, alkenyl, alkoxy, aryl or aralkyl group, wherein $R^{10}$ and $R^{11}$ are optionally bridged via the fragment Z, wherein Z is absent or is a divalent alkylene radical or alkenylene radical;
with the proviso that the fragments having the indices d, e, f and/or h are present with statistical distribution or blockwise sequencing.

2. The curable material according to claim 1;
wherein component (a) containing isocyanate groups bears no alkoxysilyl and/or alkylsilyl groups.

3. The curable material according to claim 1;
wherein, based on the individual molecule of the reaction product, there are on average more than one alkoxysilyl group per urethane or reaction product thereof.

4. The curable material according to claim 1, further comprising:
compounds having at least one isocyanate, hydroxyl, amino, epoxy, or unsaturated C=C group.

5. The curable material according to claim 4,
wherein the reactive silanes are those of the formula (4):

where:
U represents identical or different groups which are non-hydrolysable in the presence of water and catalytic amounts of Brønsted acid at temperatures of up to 100° C.;
V represents identical or different groups which are hydrolysable in the presence of water and catalytic amounts of Brønsted acid at temperatures up to 100° C., or hydroxyl groups; and
x is 1, 2, 3, or 4; and/or
wherein the silyl-functional compounds are those of the formula (5):

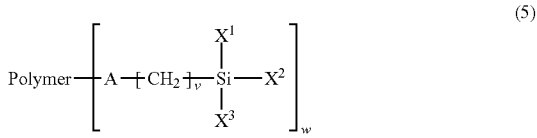

where:
$X^1$, $X^2$, and $X^3$ independently of one another are alkyl or alkoxy radicals having 1-8 C atoms;
A represents a carboxyl, carbamate, amide, carbonate, ureido, or sulphonate group containing radical, or denotes an oxygen atom;
w is an integer from 1 to 8; and
v is an integer from 1 to 20; and
wherein the polymer radical is selected from a group consisting of alkyd resins, oil-modified alkyd resins, saturated and unsaturated polyesters, natural oils, epoxides, polyamides, polycarbonates, polyethylenes, polypropylenes, polybutylenes, polystyrenes, ethylene-propylene copolymers, (meth)acrylates, (meth)acrylamides and salts thereof, phenolic resins, polyoxymethylene homopolymers and copolymers, polyurethanes, polysulphones, polysulphide rubbers, nitrocelluloses, vinyl butyrates, vinyl polymers, ethylcelluloses, cellulose acetates and butyrates, rayon, shellac, waxes, ethylene copolymers, organic rubbers, polysiloxanes, polyethersiloxanes, silicone resins, polyethers, polyether esters, and polyether carbonates.

6. The curable material according to claim 1, further comprising:
one or more blowing agents.

7. A method of improving the adhesive properties of a composition selected from the group consisting of curable compositions, adhesives, sealants, sealing compounds, binders, surface-coating materials, reactive crosslinkers, adhesion promoters, water repellents, wetting agents, primers and surface modifiers, architectural water repellents, additives in lacquer formulations, nail varnish formulations, reactive diluents, emulsions, wetting agents, paints, adhesion promoters, binders, plasticisizers, thixotropic agents, fungicides, flame retardants, pigments, fillers, functional additives in plastics, polymeric foams, organic resins or silicone resins, melt-flow-index improvers, slip additives for textiles or fibres, lubricants, matting agents, adsorbants and absorbants, self-dispersible particles, particulate emulsifiers, defoamers, binders for ceramic compositions, architectural preservatives, encapsulants, sealing systems, antistatic additives, free-flow aids, microbicidal additives, fluorescent markets, effect pigments, matting agents, release agents, low-temperature-resistant cable coatings, conductive coatings, conductor tracks, antistatic coatings, electronic and electrical components, rubber parts and membranes, sizes in the textile and glass fibre industries, paper, additives for toners, abrasives and line fillers in cosmetics, formulating agents and carrier materials, dyes and preservatives, coatings, corrosion inhibitors, inks, varnishes, tribological, and haptic coatings, the method comprising:
adding the curable material of claim 1 to said composition.

8. A method of improving the adhesive properties on or for a macroscopic or microscopic substrate comprising a material selected from the group consisting of:
metals and metal oxides, glass and glass fibres/glass fabrics, wood, wood-based materials, natural fibres, cork, silicatic materials, concrete, mortar, plaster, masonry, particles, oxidic particles, fumed silica, precipitated silicas, quartz particles and other inorganic oxide particles, glass particles, titanium dioxide, aluminium oxide, zirconium dioxide, cerium dioxide, iron oxides, copper oxides, kaolin, wollastonite, talc, mica, feldspars, hydroxides, aluminium trihydroxide, magnesium dihydroxide, boehmite, hydrotalcite and hydroxydic iron pigments, FeO(OH), carbonates, calcium carbonate and dolomite, iron, copper, zinc, nickel, aluminium, magnesium, metal alloys and carbon-containing materials, graphite and carbon black, organic particulate substrates, silicone resins, organically modified silicones, organic polymers and biopolymers, leather, tissue, paper, and mixtures thereof, the method comprising:
adding the curable material of claim 1 to the macroscopic or microscopic substrate.

9. A method of improving the adhesive properties of solutions of emulsions, or suspensions, or foams, the method comprising:
adding the curable material of claim 1 to the solutions of emulsions, or suspensions, or foams.

10. The method according to claim 9;
wherein the emulsions and/or suspensions comprise compounds selected from the group consisting of catalysts, photolatent bases, additives for modifying the rheological properties, hydrophilic fillers, organofunctional and/or partially soluble and/or water-insoluble silanes and/or siloxanes, auxiliaries, film formers, antimicrobial and preservative substances, dispersants, defoamers and deaerating agents, dyes, colorants and pigments, antifreeze agents, fungicides, adhesion promoters and/or reactive diluents, plasticizers and complexing agents, spraying assistants, wetting agents, vitamins, growth substances, hormones and/or fragrances, light stabilizers, free-radical scavengers, UV absorbers, and stabilizers.

11. A method for generating antistatic surfaces and/or as starting material for the production of rubber parts on the basis of polypropylene oxide, comprising:
adding the emulsions and/or suspensions according to claim 10 as base materials for varnishes, inks, release agents, adhesives, cosmetic products, scratch-resistant coatings, architectural preservatives, corrosion inhibitors, and/or sealants, for coating paper, particles, textile fibres, or glass fibres, or as coating fillers for paper.

12. A method of joining surfaces comprising:
providing a curable material according to claim 1 and applying the curable material to at least one of the surfaces to be joined or between the surfaces to be joined; and
adhesively bonding the surfaces to be joined with curing.

13. The method according to claim 12;
wherein the curable material is applied in the form of a foam.

14. A method of sealing or bridging or filling surfaces, cracks, or gaps, comprising:
providing a curable material according to claim 1 and applying the curable material between the surfaces, cracks, or gaps to be sealed, bridged, or filled, followed by curing.

15. The method according to claim 14;
wherein the curable material is applied in the form of a foam.

16. A method for surface-modifying particles or sheet structures, comprising:
providing the curable material according to claim 1, with mixing and/or in the presence of suitable crosslinking catalysts, as they are or from suitable organic or inorganic solvents, to the particle surfaces or sheetlike structures, or from emulsions, and then reacting thereon with covalent or physical attachment.

17. The method according to claim 16;
wherein the surfaces to be modified that are used are inorganic and/or organic particles or sheetlike structures and/or organically modified particles or sheetlike structures and/or mixtures thereof with one another.

* * * * *